US010921125B2

(12) United States Patent
Rochus et al.

(10) Patent No.: US 10,921,125 B2
(45) Date of Patent: Feb. 16, 2021

(54) OPTICAL GYROSCOPE

(71) Applicant: IMEC VZW, Leuven (BE)

(72) Inventors: Veronique Rochus, Embourg (BE);
Roelof Jansen, Heverlee (BE);
Benedetto Troia, Leuven (BE)

(73) Assignee: IMEC VZW, Leuven (BE)

( * ) Notice: Subject to any disclaimer, the term of this patent is extended or adjusted under 35 U.S.C. 154(b) by 0 days.

(21) Appl. No.: 16/690,667

(22) Filed: Nov. 21, 2019

(65) Prior Publication Data

US 2020/0158506 A1    May 21, 2020

(30) Foreign Application Priority Data

Nov. 21, 2018   (EP) ..................................... 18207555

(51) Int. Cl.
*G01C 19/66*    (2006.01)

(52) U.S. Cl.
CPC .................................. *G01C 19/662* (2013.01)

(58) Field of Classification Search
CPC ...... G01C 19/662; G01C 19/66; G01C 19/72; G01C 19/723; G02B 6/29347
See application file for complete search history.

(56) References Cited

U.S. PATENT DOCUMENTS 5,321,503 A * 6/1994 Bramson .............. G01C 19/726
356/464
5,636,021 A * 6/1997 Udd .................... G01D 5/35383
356/483

(Continued)

FOREIGN PATENT DOCUMENTS

| CN | 104655118 A | 5/2015 |
| CN | 104949938 A | 9/2015 |
| JP | S59-063510 A | 4/1984 |

OTHER PUBLICATIONS

European Search Report, European Patent Application No. 18207555.6, dated Jun. 26, 2019, 7 pages.

(Continued)

*Primary Examiner* — Jonathan M Hansen
(74) *Attorney, Agent, or Firm* — McDonnell Boehnen Hulbert & Berghoff LLP

(57) ABSTRACT

An optical gyroscope and a method for measuring an angular velocity of rotation are described. A closed-path optical cavity is configured for receiving at least a first optical signal circulating as at least one cavity mode of pre-determined orientation (inside the optical cavity. An extractor in optical communication with the optical cavity is configured for extracting a fraction of at least the circulating first optical signal from the optical cavity, wherein an amplitude of the extracted fraction increases when a resonance condition for the optical cavity in optical communication with the extractor is approached. A readout channel included in the optical gyroscope comprises an interferometric device adapted to spectrally modify the extracted fraction so as to produce a spectral Vernier effect. A difference between free spectral ranges of the interferometric device and the optical cavity is larger than the associated spectral widths. Readout detectors are included in the readout channel for detecting optical power levels of the spectrally modified optical signal, based on which the angular velocity is determined.

15 Claims, 7 Drawing Sheets

(56) References Cited

U.S. PATENT DOCUMENTS

| | | | |
|---|---|---|---|
| 6,014,217 | A | 1/2000 | Sanders et al. |
| 6,937,342 | B2 | 8/2005 | Osinski et al. |
| 7,903,255 | B2 | 3/2011 | Kaplan |
| 8,068,233 | B2 | 11/2011 | Qiu |
| 9,121,708 | B1 | 9/2015 | Qiu |
| 9,587,945 | B2 | 3/2017 | Strandjord et al. |
| 2017/0307375 | A1* | 10/2017 | Bowers .................. G01C 19/66 |

OTHER PUBLICATIONS

Adib, George A. et al., "Vernier Effect-Based Multiplication of the Sagnac Beating Frequency in Ring Laser Gyroscope Sensors", Fiber Lasers XV: Technology and Systems, Proc. of SPIE, vol. 10512, 2018, pp. 15121M-1-105121M-8.

Griffel, Giora, "Vernier Effect in Asymmetrical Ring Resonator Arrays", IEEE Photonics Technology Letters, vol. 12, No. 12, Dec. 2000, pp. 1642-1644.

Boeck, Robi et al., "Series-Coupled Silicon Racetrack Resonators and the Vernier Effect: Theory and Measurement", Optics Express, vol. 18, No. 24, Nov. 22, 2010, pp. 25151-25157.

Passaro, Vittorio M.N. et al., "Recent Advances in Integrated Photonic Sensors", Sensors, vol. 12, 2012, pp. 15558-15598.

Ma, Huilian et al., "Reduction of Backscattering Induced Noise by Carrier Suppression in Waveguide-Type Optical Ring Resonator Gyro", Journal of Lightwave Technology, vol. 29, No. 1, Jan. 1, 2011, pp. 85-90.

Dell'Olio, F. et al., "Backscattering Noise Control in the Readout Circuit of Innovative Optoelectronic Resonant Gyroscopes", 2014 Fotonica AEIT Italian Conference on Photonics Technologies, IEEE, 2014, 3 pages.

Adib, George A. et al., "Analysis of Dual Coupler Nested Coupled Cavities", Applied Optics, vol. 56, No. 34, Dec. 1, 2017, pp. 9457-9468.

Zhang, Tong et al., "Integrated Optical Gyroscope Using Active Long-Range Surface Plasmon-Polariton Waveguide Resonator", Scientific Reports, vol. 4, Jan. 24, 2014, pp. 1-6.

Stern, Brian et al., "Compact Narrow-Linewidth Integrated Laser Baed on a Low-Loss Silicon Nitride Ring Resonator", Optics Letters, vol. 42, No. 21, 2017, 6 pages.

Bauters, Jared F. et al., "Planar Waveguides With Less than 0.1 dB/m Propagation Loss Fabricated With Wafer Bonding", Optics Express, vol. 19, No. 24, Nov. 21, 2011, pp. 24090-24101.

Wang, Junjie et al., "Suppression of Backreflection Error in Resonator Integrated Optic Gyro by the Phase Difference Traversal Method", Optics Letters, vol. 41, No. 7, Apr. 1, 2016, pp. 1586-1589.

Troia, Benedetto et al., "Cascaded Ring Resonator and Mach-Zehnder Interferometer With a Sagnac Loop for Vernier-Effect Refractive Index Sensing", Sensors and Actuators, vol. 240, 2017, pp. 76-89.

* cited by examiner

OPTICAL GYROSCOPE

CROSS-REFERENCE TO RELATED APPLICATIONS

The present application is a non-provisional patent application claiming priority to European Patent Application No. 18207555.6, filed Nov. 21, 2018, the contents of which are hereby incorporated by reference.

FIELD OF THE DISCLOSURE

The present disclosure is related to the field of optical gyroscopes and angular velocity measuring techniques.

BACKGROUND

Optical gyroscopes are a class of measurement devices used to determine angular velocities of a rotating non-inertial reference system, for instance, in rotation sensors and non-inertial navigation systems, e.g. in avionics. They generally rely on the Sagnac effect, which involves the physical effect of a rotating frame on the optical phases of counter-propagating light beams. Existing optical gyroscopes such as ring lasers and fibre-based gyroscopes are often bulky, can require sophisticated calibration and external mechanical parts, and sources and detectors can suffer from vibration or temperature gradients. Attempts have been made to miniaturize these gyroscopes, but fibers have limited bend radii that can prevent further scaling, and semiconductor ring lasers can suffer from non-linearities and intra-cavity backscattering. Low-loss integrated optical technology can allow for large-area waveguide-based passive cavities achieving reasonable resolution and also strives for device integration on a single chip.

To overcome backscattering induced noise in silica waveguide-based ring micro-resonator gyroscopes, Ma et al., "Reduction of Backscattering Induced Noise by Carrier Suppression in Waveguide-Type Optical Ring Resonator Gyro," Journal of Lightwave Technology, January 2011, Vol. 29, No. 1, pages 85-90, discusses the use of a double suppression carrier phase modulation technique to demonstrate good carrier suppression levels and bias stability. However, typically only the passive resonator cavity is available on a chip, whereas the cumbersome optical access, test, and readout equipment is still external to the integrated circuit.

There is a need for highly integrated, miniaturized, mass-producible optical gyroscopes at low cost.

SUMMARY

This disclosure includes optical gyroscopes, particularly highly integrated ring resonator-based optical gyroscopes, as well as angular rotation velocity measurement methods based thereon.

In a first aspect, the present disclosure relates to an optical gyroscope. The optical gyroscope comprises a passive closed-path optical cavity configured for receiving at least a first optical signal in such a way that the received first optical signal is associated with at least one cavity mode of the optical cavity. The at least one cavity mode has a clockwise orientation or a counter-clockwise orientation. The optical gyroscope further includes an extractor, which is in optical communication with the optical cavity, for extracting a fraction of the received first optical signal from optical cavity, when it is in use. An extracted fraction of the received first optical signal is dependent on a carrier wavelength of the first optical signal and this dependence is determined by a first spectral transmittance curve, which includes a plurality of transmission peaks. An extracted fraction of the received first optical signal is also increased when the carrier wavelength of the first optical signal approaches a resonance condition of the optical cavity in optical communication with the extractor (i.e. a loaded optical cavity). Such a resonance condition is corresponding to and represented by a transmission peak on the first spectral transmittance curve. The optical gyroscope also comprises at least one readout channel for spectrally modifying, when in use, an extracted fraction of the received first optical signal and for detecting optical power levels based on the modified extracted fraction. Therefore, the at least one readout channel comprises an interferometric device, realizing the spectral modification of an extracted fraction of the received first optical signal, and at least one readout detector that is optically coupled to an output of the interferometric device. At least one second spectral transmittance curve, also comprising a plurality of transmission peaks, is associated with the interferometric device, which is furthermore adapted for spectrally aligning at least one transmission peak on the at least one second spectral transmittance curve with a transmission peak on the first spectral transmittance curve. The spectral modification by the readout channel is determined by a spectral product obtained from the at least one second spectral transmittance curve and from the first spectral transmittance curve and produces a spectral Vernier effect in a wavelength region of interest. The spectral Vernier effect is of the first kind, meaning that a difference in free spectral ranges associated with the at least one second spectral transmittance curve and the first spectral transmittance curve is greater than any one of the spectral widths associated with the plurality of transmission peaks of the at least one second spectral transmittance curve and of the first spectral transmittance curve in the wavelength region of interest.

According to embodiments of the present disclosure, the optical gyroscope may be provided as a planar lightwave circuit, which may be formed in a substrate comprising silicon on insulator, silicon nitride, multi-layered silicon-silicon nitride and/or a III-V material. This enables the design and fabrication of compact, cost-efficient and mass producible optical gyroscopes, which allows for their widespread and versatile use also outside laboratory environments. In particular, bulky readout and calibration tools are avoided.

The interferometric device may comprise at least one Mach-Zehnder interferometer, at least two Mach-Zehnder interferometers operating in parallel or at least one ring resonator. Mach-Zehnder interferometers are also easily integrated in planar lightwave circuit technology without suffering much from fabrication variabilities; their spectral transmittance curves may be tuned via programmable bias phase shifters.

The optical gyroscope may include at least one light emitting unit for generating at least a first optical signal. Therefore, bulky external light sources may be unneeded. The at least one light emitting unit may comprise a tunable light source, such as a tunable laser. This enables wavelength scans for the carrier wavelength of at least a first optical signal to be performed within the optical gyroscope in a self-contained manner. The at least one light emitting unit may further comprise an optical isolator to reduce nuisances caused by back-reflections of at least a first generated optical signal.

In embodiments of the present disclosure, the optical cavity may be provided as wave-guiding structure forming a ring resonator. Such a wave-guiding structure may be an integrated waveguide structure in a planar lightwave circuit and may be laid out as a spiraling trace, which may have self-intersecting portions. This can increase the effective area enclosed by the rotating optical cavity, whereby the Sagnac effect is also increased. At the same time, a spiraling trace assists in making a compact optical gyroscope.

In embodiments of the present disclosure, the at least one readout channel of the optical gyroscope may further comprise signal processor and/or a peak detection circuit electrically coupled to an output of the at least one readout channel for determining, when in use, an angular rotation velocity value based on the detected optical power levels. The signal processor and/or the peak detection circuit may be further adapted for generating or providing a feedback signal to a light emitting unit for stabilizing an emitted carrier wavelength against drifts and/or for aligning an emitted carrier wavelength with one of the plurality of transmission peaks on the first spectral transmittance curve. A further second readout channel may be used for generating the feedback signal based on a received second optical signal extracted from the optical cavity.

According to some embodiments of the present disclosure, the optical cavity of the optical gyroscope may be configured for receiving a first optical signal and a second optical signal, each being associated with at least one cavity mode of the optical cavity and an orientation of the at least one cavity mode for the received first optical signal being opposite to an orientation of the at least one cavity mode for the received second optical signal. A further, second readout channel may also be provided for an extracted fraction of the received second optical signal. For those embodiments, a user may select one of the respectively received optical signals for angular rotation velocity measurements, each giving rise to a Sagnac shift, i.e. a measurable detuning of the resonance wavelengths with respect to at least one clockwise or counter-clockwise cavity mode. Measurements may be repeated for a received first and a received second optical signal for comparison and measurement quality, or may combined for a more accurate determination of an angular rotation velocity. A symmetrically acting configuration in respect of a received first optical signal and a received second optical signal also provides redundancy in the optical gyroscope, an appreciable fact in case one of the readout channels fails.

According to some embodiments of the present disclosure, the optical cavity may be configured for receiving a first optical signal by means of a first optical coupler at a first position. A second optical signal may also be received by means of the same first optical coupler at the same first position or by means of a second optical coupler at a second position different from the first position. A single first optical coupler for receiving a first and a second optical signal reduces the amount of roundtrip losses within the optical cavity, resulting in higher quality optical cavities for highly sensitive angular rotation velocity measurements. Alternatively, including a first and a second optical coupler for receiving a first and a second optical signal may be beneficial for monitoring of the reflected portions of a received first and/or second optical signal so as to provide additional information on measurement conditions, such as power levels and power balance for a received first and/or second optical signal, wavelength drifts or noise levels.

In embodiments of the present disclosure, an extractor may be provided as optical couplers. For those embodiments, the extractor being optical couplers may also be used for receiving at least a first optical signal at the optical cavity.

In embodiments of the present disclosure, the optical gyroscope may further comprise a modulator for modulating a phase of at least a first optical signal at a pre-determined modulation frequency before it is received by the passive closed-path optical cavity. Such embodiments may include a first and a second phase modulator, each being associated with one of two cavity modes of the optical cavity. The first and a second phase modulator may be configured for modulating phases of optical signals at two different modulation frequencies and may be provided as one of the group of carrier injection modulator, carrier depletion modulator, thermo-optical modulator, electro-optic modulator, or a modulator based on a phase change material in a cladding. Therefore, phase modulation techniques, including single carrier suppression or double carrier suppression, may be included in those embodiments. This can be helpful for highly sensitive angular rotation velocity measurements in which backscattering induced noise is largely suppressed.

In a second aspect the present disclosure relates to a method for measuring an angular rotation velocity in a rotating reference frame. The method comprises performing a carrier wavelengths scan in a wavelength region of interest. For each carrier wavelength in a plurality of carrier wavelengths to be scanned in the wavelength region of interest the following acts can be carried out:

generating at least a first optical signal at the carrier wavelength;

modulating, at a modulation frequency, an optical phase of at least the first optical signal, the modulation frequency for the first optical signal being different from the modulation frequency for each other optical signal;

directing at least a portion of at least the modulated first optical signal onto a closed-loop trajectory, the first optical signal circulating in a clockwise direction or a counter-clockwise direction along the trajectory, an enclosed area of the closed-loop trajectory being essentially non-zero in a plane perpendicular to an axis of rotation;

deviating from the trajectory, at each roundtrip, a fraction of at least the circulating first optical signal, an amplitude of each deviated optical signal fraction being increasing when the closed-loop trajectory is approaching a resonance condition;

self-interfering the deviated fraction of at least the first optical signal with a delayed version thereof so as to produce a Vernier effect in the spectral domain, a spectral period of an accumulated optical phase due to a delay differing from a spectral period of an accumulated optical phase during one roundtrip on the closed-loop trajectory by more than a spectral resonance width associated with an overlapping resonance condition for the closed-loop trajectory and for the self-interference, a reference carrier wavelength being determined by the overlapping resonance condition for the closed-loop trajectory and for the self-interference;

detecting an optical power level at least for the self-interfered first optical signal.

Next, a peak power level and the corresponding carrier wavelength in a sequence of power levels detected for the plurality of carrier wavelengths is determined. In this respect, the corresponding carrier wavelength is indicative of a wavelength detuning with respect to the reference carrier wavelength. In a final step the angular rotation velocity is determined, based on the determined wavelength detuning.

The method may include modulating an optical phase of an optical signal with a pre-determined strength such that an amplitude of the modulated optical signal is substantially reduced at the carrier wavelength of the optical signal. The optical signal may include the additional steps of detecting optical power levels with respect to a generated and modulated second optical signal, and generating a feedback signal for adjusting a scanned carrier wavelength of the generated first optical signal and/or signal for adjusting the strength of modulating an optical phase for the generated first optical signal.

Particular aspects of the disclosure are set out in the accompanying independent and dependent claims. Features from the dependent claims may be combined with features of the independent claims and with features of other dependent claims as appropriate and not merely as explicitly set out in the claims.

The above and other aspects of the disclosure will be apparent from and elucidated with reference to the embodiment(s) described hereinafter.

BRIEF DESCRIPTION OF THE FIGURES

The above, as well as additional, features will be better understood through the following illustrative and non-limiting detailed description of example embodiments, with reference to the appended drawings.

The disclosure will now be described further, by way of example, with reference to the accompanying drawings, in which.

Figure 1:
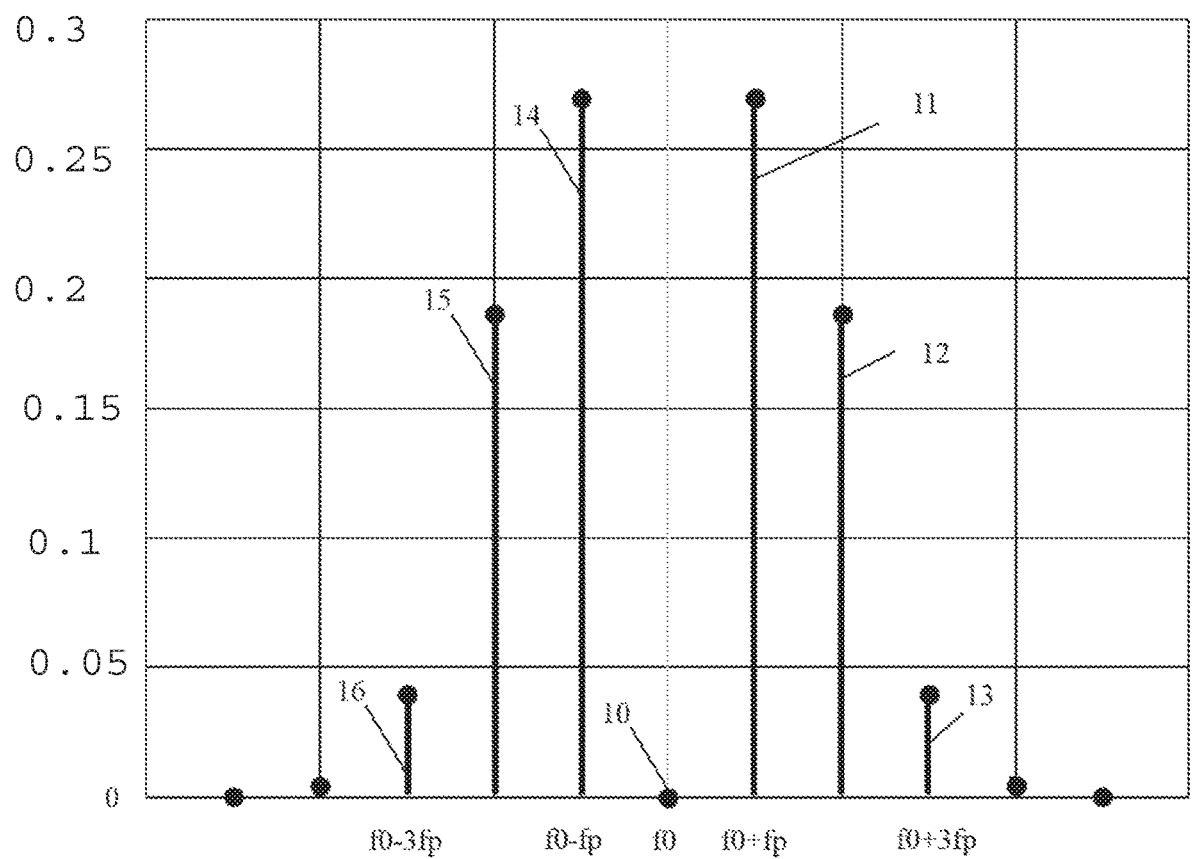
FIG. 1 schematically shows carrier wave suppression in the spectral domain achieved through phase modulation, according to an example embodiment.

The drawings are only schematic and are non-limiting. In the drawings, the size of some of the elements may be exaggerated and not drawn to scale for illustrative purposes Any reference signs in the claims shall not be construed as limiting the scope.

In different drawings, the same reference signs refer to the same or analogous elements, unless otherwise stated.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the disclosure described herein are capable of operation in other sequences than described or illustrated herein.

The term "comprising," used in the claims, should not be interpreted as being restricted to the means listed thereafter; it does not exclude other elements or steps. It is thus to be interpreted as specifying the presence of the stated features, integers, acts or components as referred to, but does not preclude the presence or addition of one or more other features, integers, acts or components, or groups thereof. Thus, the scope of the expression "a device comprising means A and B" should not be limited to devices consisting only of components A and B.

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of embodiments of the disclosure, various features of the disclosure are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed disclosure requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those in the art.

It should be noted that the use of particular terminology when describing certain features or aspects of the disclosure should not be taken to imply that the terminology is being re-defined herein to be restricted to include any specific characteristics of the features or aspects of the disclosure with which that terminology is associated.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

In the context of the present disclosure, a propagating or circulating optical signal generally has a wave-like character and is sometimes interchangeably referred to as propagating or circulating (optical) wave.

A cavity mode of a ring resonator refers to a travelling mode therein, similar to modes supported by an ordinary optical waveguide. An orientation of propagation of such cavity mode may be in a clockwise direction or in a counter-clockwise direction. A clockwise or counter-clockwise propagating cavity mode at a given wavelength may be resonant in that same cavity if it is approaching a resonance wavelength associated with the cavity. For a rotating ring resonator, due to the Sagnac effect, the clockwise and the counter-clockwise cavity mode are expected to have slightly offset resonance wavelengths.

A resonance wavelength fulfils the condition of constructive interference in an interference-based component or device.

The Sagnac effect originates from the invariance of the speed of light in different reference frames. At rest, two light beams travelling along a common closed-loop path but in opposite directions have identical roundtrip times. However, if the closed path loop arrangement is rotating with respect to a frame of reference, the roundtrip times of the two counter-propagating light beams will differ slightly from each other, leading to differing accumulated optical roundtrip phases. This optical phase difference is an observable quantity and may be measured through interference of a combined fraction of both light beams, as typically done in an interferometric gyroscope. For ring resonator-based gyroscopes, the optical phase difference is observed as a spectral distance between two resonance features of the ring resonator associated with a clockwise and a counter-clockwise wave, or it is observed as a wavelength shift in the ring resonator resonance associated with either one of and/or both the clockwise and a counter-clockwise wave. It is known that the optical phase difference equates to $$\Delta\phi = \frac{8\pi}{\lambda c}\Omega \cdot A, \quad (1)$$

where $\lambda$ is the wavelength of the light beams, c the speed of light, $\Omega$ the angular velocity of rotation and A the enclosed surface area of the closed-loop path. In consequence, it is helpful to have a large area loop such that even small angular velocities result in detectable phase shifts. Integrated optical gyroscopes generally try to increase the surface area described by the loop by either winding the optical path several times around a center of the loop, which often leads to a spiral-like coiled structure of the optical path, or by providing a high-quality, low-loss ring resonator structure which, under a resonance condition, ensures that the light beams circulating inside the ring resonator decay at a small enough rate to have a significant number of roundtrips accomplished before an optical power level of the light beams drops below a limit of detection. The present disclosure generally deals with high-quality optical ring resonator gyroscopes and readout/detection circuitry.

In addition to the conflicting task of achieving a large-area but compact optical gyroscope, an additional complication at low angular velocities arises from backscattering. Intracavity backscattering, e.g. mediated by Rayleigh scattering or sidewall roughness in integrated waveguide-based microresonators, provides a coupling mechanism between the clockwise (CW) and the anti-clockwise (CCW) modes, which are nearly degenerate at low enough angular velocities. Injection locking or resonance splitting are typically unwanted effects which can be detrimental to a reliable readout. A possible remedy hereto has been found in the phase modulation of the light signal corresponding to either the CW wave or the CCW wave (single carrier suppression), or both at the same time (double carrier suppression), which allows for a strong suppression of the carrier signal and a concentration of the optical signal energy in the first few higher harmonics. As a result, the wavelength difference between the CW and the CCW light wave can be increased beyond a critical threshold at which mode coupling ceases to occur.

Periodically modulating the optical phase $\varphi$ of a light wave at a pre-determined frequency $f_p$ changes the spectral composition of the light wave. For a single-tone phase modulation signal, e.g. a cosine function of the pre-determined frequency $f_p$, the Jacobi-Anger expansion formula may be used to re-express the resulting light wave as a superposition of plane waves in Eq. 2.

$$e^{i\varphi(t)} = e^{ik_0 L(n+\Delta n \, cos(2\pi f_p t))} = e^{ik_0 n s} \sum_{m=-\infty}^{m=\infty} i^m J_m(k_0 L \Delta n) e^{im2\pi f_p t} \quad (2)$$

This also applies to guided light waves in a waveguide, but the effective index is used. From Eq. 2 it is seen that the modified spectrum after phase modulation includes harmonic overtones of the fundamental frequency $f_p$, also referred to as the sidebands of the carrier signal, and their respective contribution to the overall signal is weighted by a factor which can be expressed as a regular Bessel function of order m evaluated at the modulation strength $M=k_0 L \Delta n$. The change in refractive index may be caused by electro-optic coupling, e.g. via carrier injection, carrier depletion, Pockels effect, etc., and typically is proportional to an applied signal strength, e.g. proportional to the applied voltage in an electro-optical modulator (e.g. LiNbO$_3$). Hence, one may express the modulation strength as a function of the applied voltage signal $M=\pi V/V_p$, wherein $V_p$ is the half-voltage causing a pi phase shift. Other optical coupling mechanisms for the phase modulation signal may include thermo-optical heaters, piezo-electric materials in the waveguide or cladding, acousto-optic coupling, liquid crystal cladding, etc. By carefully tuning M, e.g. via the applied voltage signal, it is possible to substantially reduce or suppress the fundamental tone, e.g. the carrier itself, so as to confine the spectrally modified signal into the sidebands.

Suppression of the fundamental tone is achieved if $J_0(M)=0$, which is true for $M=2.4048$, $M=5.5201$, $M=8.6537, \ldots$. This is schematically shown in FIG. 1, in which an unmodulated narrowband laser line at $f_0$ and unit amplitude is phase-modulated at a modulation frequency $f_p$, resulting in multiple overtones in the spectral domain, e.g. first harmonics 11, 14, equally offset by a value $\pm f_p$ from the initial laser line at $f_0$ and having a reduced spectral power amplitude, second harmonics 12, 15, equally offset by a value $\pm 2f_p$ from the initial laser line at $f_0$ and having a more reduced spectral power amplitude than the first harmonics 11, 14, third harmonics 13, 16, equally offset by a value $\pm 3f_p$ from the initial laser line at $f_0$ and having an even more reduced spectral power amplitude than the second harmonics 12, 15, and so forth. It is observed that a spectral component of the initial laser line at $f_0$ (carrier wave) is largely suppressed for a modulation depth $M=2.4048$ in FIG. 1 and that the spectral power is redistributed into higher harmonics, e.g. mainly into the first and second harmonics.

Figure 2:
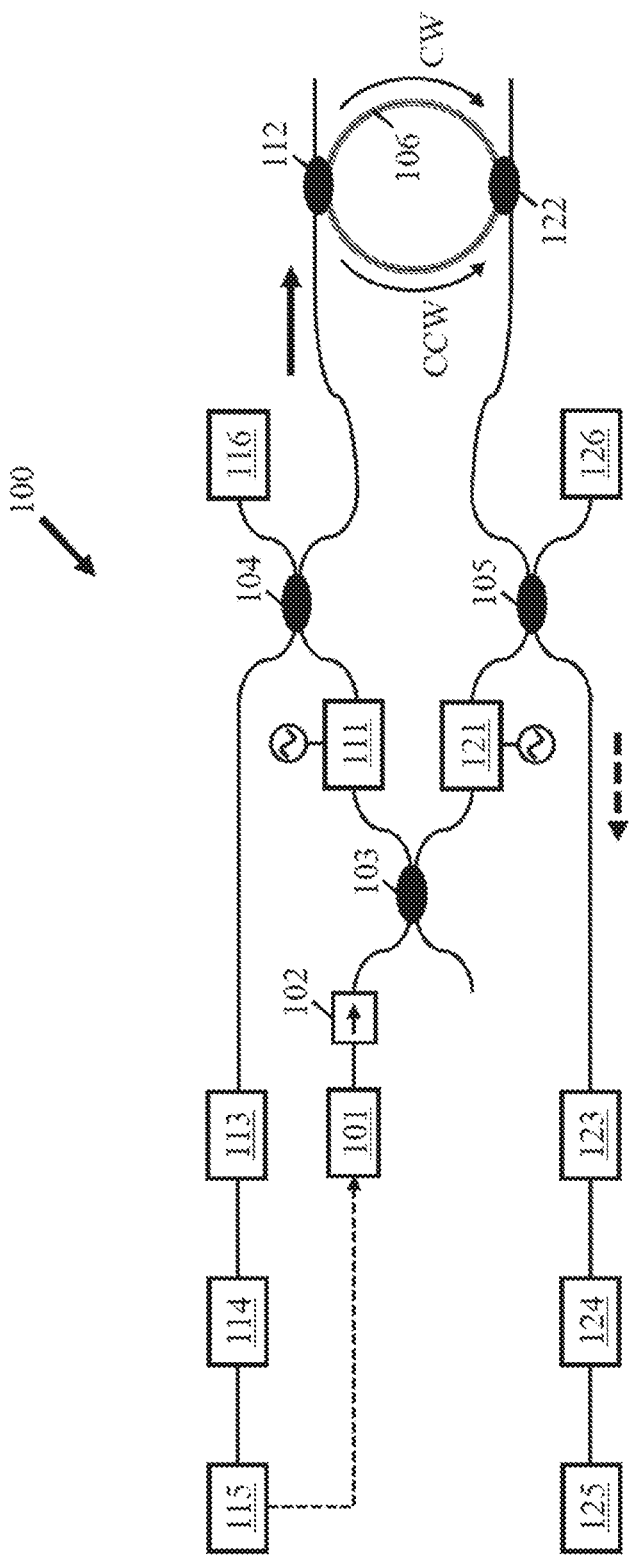
FIG. 2 shows a schematic of an optical gyroscope, according to an example embodiment.

An embodiment of the first aspect of the present disclosure is now described in reference to FIG. 2 which shows a schematic of an optical gyroscope 100. An optical gyroscope 100 may comprise first and second modulators 111, 121 for modulating the optical phase of optical signals, generated by a light emitting unit 101, at a first frequency $f_{p1}$ and a second frequency $f_{p2}$, respectively. Although their presence is generally desirable for good performance at low backscattering noise levels, the modulators 111, 121 are not strictly required in embodiments of the present disclosure. A more compact and less complex optical gyroscope with a higher noise figure may be included in some applications. The optical gyroscope 100 further comprises a passive closed-path optical cavity 106 for receiving a first and a second optical signal, which, for the present embodiment, correspond to the phase-modulated optical signals at the outputs of the first and second modulators 111, 121, wherein the first and the second optical signal are received in such a way that they circulate as two counter-propagating waves, corresponding to the CW mode and to the CCW mode of the optical cavity 106, respectively. Extractors 112, 122 for extracting a fraction of the optical power associated with a circulating cavity mode from the passive closed-path optical cavity 106 and directing it to a corresponding readout channel are also included in the optical gyroscope 100. In this connection, an amplitude of the extracted optical power fractions associated with a circulating cavity mode (e.g. CW or CCW cavity mode) is increased when the passive closed-path optical cavity 106 approaches a resonance condition, e.g. the optical cavity 106 is configured as an add-drop ring resonator for probing the circulating cavity modes therein in transmission. The optical gyroscope 100 includes at least one first readout channel associated with one of the two counter-propagating cavity modes, e.g. with the CW cavity mode, comprising an interferometric device 123, and at least one readout detector 124, optically coupled to an output of the interferometric device 123 for detecting optical power levels. For this particular embodiment, a second readout channel associated with the other one of the two counter-propagating cavity modes, e.g. with the CCW cavity mode, is also provided and comprises another interferometric device 113 and at least one further readout detector 114 optically coupled to an output of the interferometric device 113. The interferometric devices 123 of the at least one readout channel is adapted to receive and spectrally modify (e.g. spectrally reshape) the extracted fraction of the optical power associated with the corresponding cavity mode, wherein the spectral modification (e.g. change in the spectral transmittance curve related to the optical cavity) is such that a free spectral range (FSR) in a spectral transmittance curve associated with the interferometric device 123 of the at least one readout channel combines with a free spectral range in a spectral transmittance curve of the passive closed-path optical cavity 106 so as to produce a spectral Vernier effect. Moreover, a difference between the $FSR_{IFD}$ associated with the interferometric device 123 and the $FSR_{CAV}$ associated with the passive closed-path optical cavity 106 is larger, for two spectrally at least partially overlapping resonance features (e.g. for a common resonance wavelength), than any one of the spectral widths associated with the two spectrally at least partially overlapping resonance features, e.g. larger than any one of the two FWHM spectral widths). This relation is also known as first Vernier regime and can be expressed mathematically as $$\Delta FSR = |FSR_{IFD} - FSR_{CAV}| > \max(FWHM_{IFD}, FWHM_{CAV}). \quad (3)$$

The optical gyroscope 100 is provided as a planar lightwave circuit (PLC), through which a highly integrated, compact device may be obtained. External optical access, test and readout equipment, which may include expensive or bulky mechanical, electronic or optical parts, are not required in this case, which can greatly simplify the testing and calibration of the optical gyroscope and also can make it more versatile for industrial applications. A completely or partially integrated optical gyroscope also benefits from an increased robustness with regard to vibrations, shocks and temperature changes. Available integrated optics/photonics technologies for implementing the optical gyroscope as a planar lightwave circuit in a substrate may include silicon-on-insulator or silicon nitride platforms, a mixed (multi-) layered silicon-silicon nitride platform, active III-V material platforms such as InGaP, InGaAs, InP, etc. These integrated photonics platforms can provide mass-producible devices at low-cost and with good repeatability.

The modulators 111, 121 modulate the optical phase of the first and second optical signal, being associated with at least one clockwise (CW) cavity mode and at least one counter-clockwise (CCW) cavity mode, prior to being received by the passive optical cavity 106. They may be provided as integrated phase modulators in a photonic circuit to which electrical control signal are applied, e.g. periodic voltage signals with frequencies $f_{p1}$ and $f_{p2}$ generated by an electrical signal generator connected to an input of the phase modulators. Non-limiting examples for such phase modulators include doped-silicon carrier injection or carrier depletion modulators, electro-optic modulators (e.g. based on integrated $LiNbO_3$), thermo-optic phase shifters/heaters or phase modulators based on liquid-crystal or phase change materials that can form a cladding material of an optical waveguide structure. Light emitted by a light emitting unit 101 may be split by a 50/50 beam splitter 103 for delivering a first and a second optical signal of equal magnitude (e.g. they are power-balanced) to the respective modulators 111, 121.

A light emitting unit 101 is part of the optical gyroscope 100, e.g. a monolithically or hybrid integrated light source on a photonic chip comprising the optical gyroscope 100 implemented as a planar lightwave circuit. Alternatively, the light emitting unit 101 is provided as an external device which is coupled to the optical gyroscope 100, e.g. an external laser which is coupled to the optical gyroscope PLC via grating couplers, inverted tapers, micro-prisms, waveguide facets, etc (add also flip-chipped). Typically, the light emitting unit 101 further comprises an optical isolator 102 for avoiding coupling of back-reflected light into a light emitter, e.g. a laser, which may negatively impact the stability and quality of the light emitter, e.g. increased intensity fluctuations, unwanted wavelength drifts, etc. Tunable laser sources may be used as light emitters, including distributed feedback (DFB) lasers, distributed Bragg reflector (DBR) lasers, lasers implemented in III-V materials or waveguide-based lasers, as proposed, for example, by Stern et al. "Compact narrow-linewidth integrated laser based on a low-loss silicon nitride ring resonator", Optics Letters, 2017, Vol. 42, Issue 21, pp. 4541-4544. These lasers are generally suitable for be direct fabrication on, transfer-printing or hybrid-integration onto a photonic chip or PLC comprising the optical gyroscope, e.g. photonic chip implemented in silicon-on-insulator or silicon nitride technology. Given the fact that the passive optical cavity 106 functions as a ring resonator in which the CW and CCW light waves circulate to accomplish as many roundtrips as possible, a tunable laser source with sufficiently long coherence length is typically provided, e.g. with a lasing linewidth (FWHM) of the order of kHz or up to some MHz at emission wavelengths in the NIR (e.g. 1550 nm), yielding coherence lengths of the order of meters. For a better noise rejection, tunable laser sources with a low relative intensity noise (RIN) are helpful, e.g. RIN better than 130 dBc/Hz. Both the optical isolator 102 and the splitter 103 may be integrated photonic devices. For instance, waveguide-type isolators with a (ferri-) magnetic garnet cladding or a modulation-induced time-reversal symmetry breaking may be used to obtain a non-reciprocal device. The splitter 103 may be provided as a waveguide-based Y-junction splitter, a multi-mode interference (MMI) coupler, a directional waveguide coupler, a star coupler, etc.

Optionally, the light paths between the modulators 111, 121 and the passive optical cavity 106 may comprise two additional couplers 104, 105, which are optically coupled to monitoring detectors 116, 126, respectively. This allows an easy access for monitoring the signal outputs from the modulators 111, 121. Monitored quantities may include the optical power levels obtained after phase modulation but before injection into the passive optical cavity 106, a possible imbalance in optical power levels for the phase-modulated first and second optical signal prior to injection into the passive optical cavity 106 which may require a re-balancing adjustment, a carrier wavelength suppression level and/or first harmonic signal level of the phase-modulated first and second optical signals prior to injection into the passive optical cavity 106 if the monitoring detectors 116, 126 are further connected to an electrical spectrum analyzer or their respective detection bandwidth is controlled. As for the splitter 103, the two additional couplers 104, 105 may be provided as waveguide-based Y-junction splitter, a multi-mode interference (MMI) coupler, a directional waveguide coupler, a star coupler, etc.

The passive closed-path optical cavity 106 is configured to receive the phase-modulated optical signals delivered by the modulators 111, 121. This may be achieved by means of optical couplers which couple a portion of the phase-modulated optical signals into the closed-path optical cavity 106. Typical optical couplers may include integrated multi-mode interference (MMI) couplers, directional waveguide couplers, star couplers, etc. For the present embodiment in FIG. 2, two optical directional couplers are provided at two different locations along the passive optical cavity 106. Incidentally, the optical couplers coincide with the optical couplers used as extractors 112, 122, but this does not necessarily have to be the case for other embodiments. However, such an arrangement can be helpful in that coupling losses are reduced for the passive optical cavity 106, which therefore may achieve a better quality factor (Q-factor) and, by consequence, a better resolution of the optical gyroscope 100. The injected phase-modulated optical signals then counter-propagate as CW and CCW cavity modes inside the passive optical cavity 106. If the optical gyroscope 100 is rotating with respect to a reference frame, the CW and CCW cavity modes will accumulate an optical phase difference as indicated in Eq. 1 after each completed roundtrip. The passive optical cavity 106 may be a (micro-) ring resonator of large radius, yielding a large enclosed area A, as it is schematically shown in FIG. 2. Yet, as the cavity roundtrip losses scale with its perimeter length and the cavity $FSR_{CAV}$ gets increasingly small for larger perimeter lengths, excessively long passive optical cavities 106 may become impracticable, even for very low-loss waveguides. Therefore, a passive optical cavity 106 in a PLC optical gyroscope may have lengths ranging from a few millimeters to a few centimeters, which typically results in FSRs of the order of picometers at near-IR wavelengths (e.g. 1550 nm). In an integrated photonic solution or PLC, however, it is desirable to reduce the footprint of the passive optical cavity 106 to achieve more compact devices. It is thus helpful to provide a coil or spiral-like passive optical cavity structure with optimized waveguide crossings in the return path instead a large ring resonator. For such a structure, the enclosed area is increased through the multiple windings of the waveguide, thereby also increasing an accumulated phase shift. In non-integrated optics, the passive optical cavity 106 may be implemented as an optical fiber or fiber spool.

A resonance feature of order m for the passive optical cavity 106 using integrated waveguides, e.g. a resonance peak in the spectral transmittance curve associated with the optical cavity 106, may be met if the following relation is fulfilled: $m*\lambda_{res}=n_{eff}*L_{CAV}$, where $n_{eff}$ is the effective refractive index of the cavity waveguide at resonance wavelength $\lambda_{res}$. Resonance features of increasing order are nearly periodic and separated in wavelength by the cavity $FSR_{CAV}=\lambda^2/(n_g*L_{CAV})$, where $n_g$ is the group index of the cavity waveguide. Depending on the material platform, a millimeter or centimeter long passive optical cavity 106 may have a free spectral range of the order of picometers or, correspondingly, of the order of GHz. A high-finesse passive optical cavity may therefore have spectral resonance features with characteristic spectral width (e.g. FWHM width) of tens of MHz, whereas a lower finesse widens the resonance features to hundreds of MHz or even a few GHz.

In embodiments, the passive optical cavity 106 confines and guides the circulating CW and CCW waves in a planar waveguide structure, e.g. in a ridge or rib or embedded waveguide. Depending on the waveguide geometry (e.g. 400 nm to 5000 nm wide and 50 nm to 300 nm high waveguides of rectangular cross-section) and material platform (e.g. SiN or SOI), effective refractive indices may vary between 1.45 and 3.00. In this context, high-contrast material platforms such as SOI achieve larger effective refractive indices, which favorably increases the optical path length at a constant cavity length. Low-loss material platforms such as SiN yields propagation losses as low as 0.1 dB/m, as demonstrated by Bauters et al. "Planar waveguides with less than 0.1 dB/m propagation loss fabricated with wafer bonding", Optics Express, 2011, Vol. 19, Issue 24, pp. 24090-24101, for a 14 micrometer wide and 100 nm high SiN waveguide at 1580 nm wavelength. Ultra-low propagation losses are beneficial for achieving high-Q passive optical cavities 106 and good resolution. For integrated SOI or SiN optical gyroscopes, achievable resolutions in the range of about 1 deg/s/Hz$^{1/2}$ to about $10^{-3}$ deg/s/Hz$^{1/2}$ are predicted, which is competitive in performance with available MEMS-based gyroscopes. High-finesse passive optical cavities 106 are often critically coupled and values of cavity finesse may be order of 10-30 or higher for a critically coupled centimeter long cavity, depending on propagation losses of available integrated photonics platforms (e.g. ranging between about 1 dB/cm to about 1 dB/m or less). Critically coupled ring resonator passive optical cavities typically exhibit a small power coupling ratio of κ=0.1 or smaller; for the present embodiment in FIG. 2, which corresponds to an add-drop configuration, this implies that a power coupling ratio for either one of the two couplers (e.g. the extractor 112) takes into account the additional loading of the passive optical cavity 106 due to the presence of the other coupler (e.g. the extractor 122). The following relations may hold for the reflection coefficients $r_1$, $r_2$ and power coupling ratios $\kappa_1$, $\kappa_2$ of a critically coupled passive optical cavity 106 with propagation loss per unit length α.

$$r_1 = r_2 * \exp(-\alpha/2 * L_{CAV})$$

$$\kappa_1 \approx \kappa_2 + \alpha * L_{CAV}$$

As the compound quality Q-factor of a cavity is reduced in the presence of additional loading of the cavity, compared with its intrinsic quality factor, the skilled person may prefer small power coupling ratios for critical coupling to improve the compound quality Q-factor of the passive optical cavity 106, whereby a longer effective cavity length and hence better resolution is achieved. It is worth noting that for intra-cavity roundtrip losses ($\alpha * L_{CAV}$) which are negligible compared to a power coupling ratio $\kappa_2$, a symmetric design (e.g. $\kappa_1 \approx \kappa_2$) results for the two couplers (e.g. the extractor 112) in the critically coupled add-drop configuration. This can be desirable form a design point of view, as it requires the adjustment of one independent parameter. Intra-cavity roundtrip losses ($\alpha * L_{CAV}$) may become negligible for a given cavity length $L_{CAV}$ if the propagation losses can be significantly reduced. This is the case, for example, for silicon nitride-based technology, in which propagation losses for the passive optical cavity 106 may be as small as 0.1 dB/m or even lower; a passive optical cavity 106 of length $L_{CAV}$=3.14 cm and a power coupling ratio $\kappa_2$=0.01 would indeed be critically coupled according to an add-drop configuration if $\kappa_1$=0.0107≈$\kappa_2$. Therefore, symmetric coupling conditions for the first and second optical signal (e.g., the CW and the CCW wave) may be obtained in the add-drop configuration for an optical cavity 106 using waveguides with ultra-low propagation losses. It is also noted that a cavity length $L_{CAV}$ is generally not exceeding a few centimeters in practical lightwave circuits (e.g. based on Si or SiN technology) given that too short of a free spectral range ($FSR_{CAV}$) related thereto is negatively affecting the dynamic range of the optical gyroscope. Embodiments of the present disclosure are not limited to this symmetric coupling condition, however, and may be put into practice for an asymmetric, critical coupling condition too (e.g. for $\kappa_1 > \kappa_2$ and $\kappa_1 \approx \kappa_2 + \alpha * L_{CAV}$). A balanced power coupling of both the first and second optical signal to the passive optical cavity 106 is not a requirement since information on the angular rotation velocity may be derived from detected optical power levels at one of the two readout detectors 114, 124, which is representative of a shift in the resonance wavelength associated with one of the CW or CCW cavity mode.

As already mentioned, extractors 112, 122, for the embodiment in FIG. 2, coincide with the input coupler at the passive optical cavity 106, e.g. extractors 112, 122 may be provided as integrated multi-mode interference (MMI) couplers, directional waveguide couplers, star couplers, etc. They extract a fraction of the optical power associated with a wave (e.g. CW or CCW cavity mode) circulating inside the passive optical cavity 106, wherein the extracted optical power fraction is of the same magnitude as the power coupling ratio because of the reciprocal nature of these devices. Although a power coupling ratio may be small (e.g. about 0.1 or smaller), extracting only a small fraction of the total optical power associated with a resonant wave circulating inside the passive optical cavity 106 allows the extracted optical power to be still appreciable in absolute terms. The reason for this is the resonant behavior a wave experiences in an optical cavity, e.g. the multiple interferences of a coherent light wave that occur inside the optical cavity after multiple roundtrips at the resonant condition. A first optical coupler 112, for example, couples the phase-modulated first optical signal, associated with at least one CW cavity mode and modulated at a first frequency $f_{p1}$ by the first modulator 111, into the passive optical cavity 106 at a first position and extracts a fraction of the optical power associated with a circulating CCW cavity mode from the passive optical cavity 106 at the same first position. The injection and extraction are simultaneous, but independent processes. Likewise, a second optical coupler 122 couples the phase-modulated second optical signal, associated with at least one CCW cavity mode and modulated at a first frequency $f_{p2}$ by the second modulator 121, into the passive optical cavity 106 at a second position and extracts a fraction of the optical power associated with a circulating CW cavity mode from the passive optical cavity 106 at the same second position. The extracted optical power fractions of each circulating CW and CCW cavity mode are obtained in the transmission mode of the optical cavity 106, meaning that their spectral transfer characteristic is correctly described by a spectral transmittance curve of the optical cavity 106 in optical communication with the an extractor, e.g. optical couplers 112, 122. If the optical gyroscope 100 is rotating in a clockwise (CW) or counter-clockwise (CCW) direction, both the excited CW cavity mode and the excited CCW cavity mode will experience a relative phase shift, which for the excited CW cavity mode is of opposite sign compared with the excited CCW cavity mode. Hence, an extracted optical power fraction for a CW cavity mode will be largest at a resonance wavelength for the CW cavity mode, i.e. a transmission peak on the CW transmittance curve, and this resonance wavelength for the CW cavity mode is detuned with respect to a common reference resonance wavelength at rest. Likewise, an extracted optical power fraction for a CCW cavity mode will be largest at a resonance wavelength for the CCW cavity mode, i.e. a transmission peak on the CCW transmittance curve, and this resonance wavelength for the CCW cavity mode is detuned with respect to a common reference resonance wavelength at rest, but in a direction opposite to the resonance wavelength detuning for the CW cavity mode. This is also described by a splitting of the respective CW and CCW spectral transmittance curves, which coincide for an optical gyroscope 100 at rest, in which case they are degenerate.

The relative phase shift is indicated in Eq. 1 and is representative of a detuning of the passive optical cavity 106 with respect to a reference wavelength or frequency, e.g. with respect to a spectral component of the first or second optical signal (e.g. a first harmonic component), or with respect to a resonance wavelength or resonance frequency of the passive optical cavity 106 at rest. For a passive optical cavity 106 that has the structure of a ring resonator, one derives, using $A=L_{CAV}^2/(4\pi)$, the following expression for the sensitivity per cavity roundtrip for either the CW or CCW wave from Eq. 1.

$$\frac{\partial \Delta \phi_{CW/CCW}}{\partial \Omega} = \pm \frac{L_{CAV}^2}{\lambda c}$$

An extracted fraction of the optical power associated with a CW cavity mode is directed, here via an additional coupler 105, to an input of the at least one readout channel, e.g. to an input of the first interferometric device 123. Similarly, an extracted fraction of the optical power associated with a CCW cavity mode may be directed, here via an additional coupler 104, to an input of a further, second readout channel, e.g. to an input of the second interferometric device 113. In embodiments of the present disclosure, the first and second interferometric devices 113, 123 may be of the same type, e.g. a first and a second Mach-Zehnder interferometer or a first and a second interferometric ring resonator, or may be of different types, e.g. one Mach-Zehnder interferometer and one interferometric ring resonator. In an embodiment, both the first and the second interferometric devices 113, 123 are provided as integrated Mach-Zehnder devices, for which two power-balanced interferometer arms are characterized by a different optical phase delay, resulting in a spectral power transfer function which shows a $\cos^2$-dependence on the phase delay. Integrated Mach-Zehnder interferometers (MZIs) offer the potential benefit of suffering less from temperature-induced spectral shifts as well as from reduced sensitivity to waveguide process variability as compared to interferometric ring resonators. In addition thereto, they may be designed as a thermal MZIs in which the phase shifts in each arm, caused by the thermo-optic effect, are nearly cancelling by selection of the proper waveguide dimensions in each arm. Moreover, their spectral transfer/transmission function is characterized by a more gentle transition between passbands and stopbands in contrast to the steeper roll-off and wider stopbands characteristic of ring resonators, which makes them less sensitive to wavelength shifts and better suited for highly sensitive optical gyroscopes with a large dynamic range. Although interferometric devices 123, 113 comprising one or more Mach-Zehnder interferometers is helpful because of their robustness against fabrication variability and temperature drifts, interferometric devices 123, 113 comprising one or more ring resonators whose spectral resonance linewidths are substantially larger than a spectral width of a resonance peak in the spectral transmittance curve of the optical cavity, e.g. non-critically coupled ring resonators, are another non-limiting example of an interferometric device 123, 113. A resonance wavelength, satisfying the condition of constructive interference of order m for interferometric devices 113, 123 of the Mach-Zehnder type, may be determined by the following relation: $m^*\lambda_{res}=n_{eff}^*\Delta L_{MZ}$, wherein $n_{eff}$ is the effective refractive index of the waveguides used in the interferometer arms at resonance wavelength $\lambda_{res}$ and $\Delta L_{MZ}$ is a length difference between the two interferometric arms (assuming similar waveguide geometries and materials for both arms), leading to an additional optical phase delay for an optical wave propagating along the longer of the two interferometer arms. In embodiments, a condition for constructive interference of interferometric devices 123, 113 is matched to the resonance condition of the passive optical cavity 106, e.g. the resonance wavelength $\lambda_{res}$ is common to both the MZI and the optical ring resonator cavity 106. This may be achieved by an additional passive or active phase-tuning element (bias phase shift) arranged on one or both arms of the MZI interferometer, or on the waveguide of an interferometric ring resonator, e.g. a passive waveguide delay corresponding to, for example, a half-wavelength shift, or an active integrated thermo-optic or electro-optic phase shifter.

Figure 6:
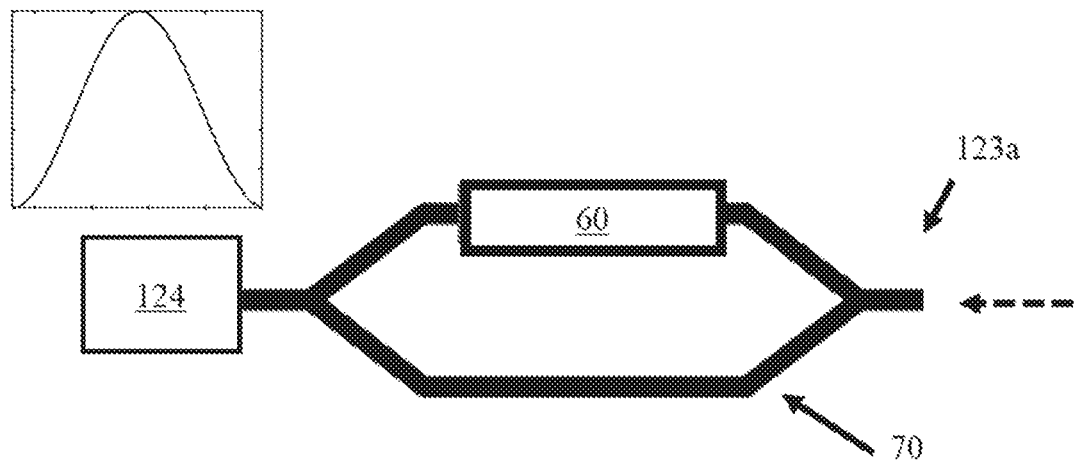
FIG. 6 shows an interferometric device comprising a single Mach-Zehnder interferometer, according to an example embodiment.

FIG. 6 illustrates a readout channel in which the interferometric device 123a comprises a single Mach-Zehnder interferometer 70 having its output optically coupled to a readout detector 124. A bias phase shift 60 may be applied to one of its two arms such that a condition for constructive interference for the interferometric device 123a is fulfilled at a wavelength that coincides with a resonance wavelength of the passive optical cavity 106 at rest.

Figure 7:
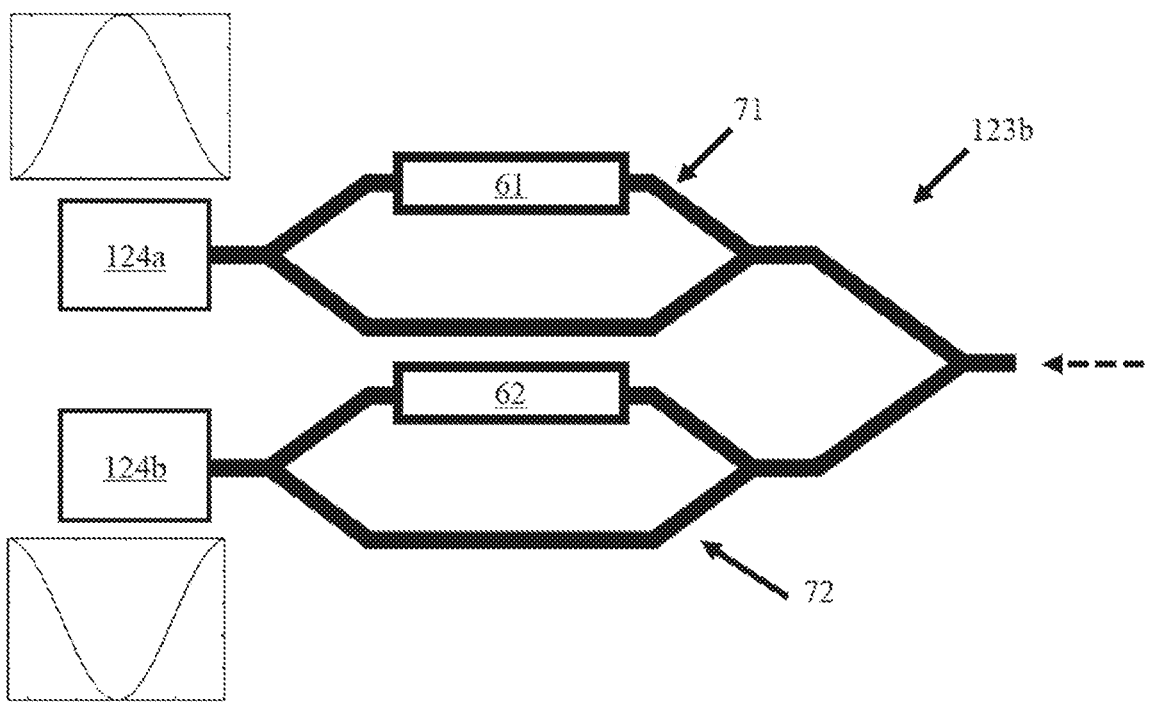
FIG. 7 shows an interferometric device comprising two Mach-Zehnder interferometers with a single input, according to an example embodiment.

FIG. 7 illustrates a readout channel in which the interferometric device 123b comprises a first Mach-Zehnder interferometer 71 having its output optically coupled to a readout detector 124a and a second Mach-Zehnder interferometer 72 having its output optically coupled to another readout detector 124b. A bias phase shift 61 may be applied to one of the two arms of the first Mach-Zehnder interferometer 71 such that a condition for constructive interference for the interferometric device 123b is fulfilled at a wavelength that coincides with a resonance wavelength ($\lambda_{res,1}$) of the passive optical cavity 106 at rest. Besides, bias phase shift 62 may be applied to one of the two arms of the second Mach-Zehnder interferometer 72 such that a condition for constructive interference for the second Mach-Zehnder interferometer 72 is fulfilled at a wavelength that coincides with a further resonance wavelength ($\lambda_{res,2}$) of the passive optical cavity 106 at rest, e.g. an adjacent resonance wavelength of the optical cavity $106\lambda_{res,2}=\lambda_{res,1}+FSR_{CAV}$. This may be achieved by selecting a bias phase shift 62 for the second Mach-Zehnder interferometer 72 which is larger by an amount of $\pi$ compared with the bias phase shift 61 for the first Mach-Zehnder interferometer 71. However, this particular choice for spectral alignment and for the bias phase shift 62 for the second Mach-Zehnder interferometer 72, or any further Mach-Zehnder interferometer, is not limiting. Indeed, different embodiments of the disclosure may provide an interferometric device 123 comprising more than one MZI, e.g. a collection of MZIs with shifted spectral transmittance curves, e.g. shifted by multiples of $\pi/2$ or $\pi/4$ by adding additional length differences to the longer path in each MZI device of the collection, and for which each MZI of the collection is receiving substantially the same portion of an extracted optical power fraction from the passive optical cavity 106, e.g. via a suitable 1-to-N splitter, and is connected to a dedicated readout detector. Therefore, some MZIs may be spectrally aligned on wavelengths which, at rest, correspond to intermediate regions of the spectral transmittance curve of the optical cavity 106, e.g. located between adjacent resonance peaks.

In embodiments, the readout detectors 124, 114 and, if present, the monitoring detectors 116, 126 or any additional detectors, are provided as fully integrated Si or SiGe photodetectors. Depending on the performance requirements of the optical gyroscope 100, their characteristics may include an operational bandwidth of the order of 1 GHz or larger, a responsivity of at least 0.7 W/A, dark current levels below 50 nA at room temperatures (20° C.), and noise-equivalent power (NEP) less than or equal to 20 nW*Hz$^{-1/2}$. However, embodiments of the present disclosure are not limited to these photodetectors and may comprise different detector types, e.g. PIN InGaAs photodetectors.

Readout detectors 114, 124 may further comprise a fast peak detection circuit for detecting a peak in a sequence of measurement data or the signal detected by readout detectors 114, 124 is processed by a signal processor 115, 125 which are adapted to robustly detect a peak in a sequence of measurement data. Here, a sequence of measurement data typically refers to a sequence of detected optical power levels obtained during a single sweep of the carrier wavelength of at least the first optical signal. A single sweep of the carrier wavelength may performed over a pre-determined wavelength region of interest, which may be known or determined during a calibration procedure of the optical gyroscope. This pre-determined wavelength region of interest typically includes only one transmission peak on the first spectral transmittance curve, e.g. on the spectral transmittance curve corresponding to the (rotating) optical cavity, therefore only one peak power level might be detected by the peak detection circuit or the signal processor during a single sweep of the carrier wavelength.

When the optical gyroscope 100 is operated, the modulators 111, 121 may each be driven by a periodic signal whose strength (corresponding to a modulation depth M) is set to suppress the respectively received optical signal carrier, e.g. such that $J_0(M)=0$ for the optical carrier wavelength emitted by the light emitting unit 101 and split by the 50/50 splitter 103. Hence, the carrier wavelengths of both the optical signals associated with the CW cavity mode and the CCW cavity mode may be suppressed via phase modulation by adjusting a modulation depth value M, e.g. M=2.4048. The optical signal energy is then distributed across the first few higher-order harmonics of the modulation frequency, e.g. 54% in the first (double-sided) sideband (first harmonic), 37% in the second (double-sided) sideband (second harmonic) and 8% in the third (double-sided) sideband (third harmonic) for the first zero at M=2.4048. Slightly different frequencies for phase modulation by the first and second modulators 111, 121 may be selected in practice for nearly power-balanced harmonics corresponding to the first and second optical signal, e.g. $f_{p1}=9.1$ MHz and $f_{p2}=9$ MHz, which is sufficient to overcome the detrimental effects caused by intra-cavity backscattering, e.g. injection pulling or injection locking leading sometimes to dead zones in the detection of small angular rotation velocities. This modulation scheme corresponds to double carrier suppression and can be helpful for highly sensitive optical gyroscopes. As extractors 112, 122 are extracting each a fraction of the power associated with either the circulating wave of the CCW cavity mode or the circulating wave of the CW cavity mode, the respective readout channels for the CW cavity mode and the CCW cavity mode are physically separated, whereby potentially overlapping spectra at the detectors 114, 124 are avoided. A skilled person will know how to select suitable modulation frequencies taking into account the constraints of emission wavelength and linewidth of the optical signal delivered by the light emitting unit 101, e.g. tunable laser, the cavity FSR and the characteristic spectral width of the resonance feature of the passive optical cavity 106. For instance, the skilled person may try to avoid that the higher harmonics of the phase-modulated first and second optical signal (associated, respectively, with more than one CW cavity mode and more than one CCW cavity mode, not all of which have to be resonant) overlap with a different resonance feature of the passive optical cavity 106 not used for angular velocity sensing, e.g. an overlap with a transmission peak of the passive optical cavity 106 corresponding to a different resonance order m. This may be obtained by selecting a modulation frequency $f_p$ to be significantly smaller (e.g. at least five times smaller) than the cavity free spectral range $FSR_{CAV}$, e.g. $f_p=9$ MHz, $FSR_{CAV}=2.6$ GHz, such that $f_p<FSR_{CAV}$. Moreover, in embodiments of the disclosure using the double carrier suppression modulation scheme, one may select the first and/or second modulation frequencies such that the corresponding higher harmonics of the phase-modulated first and second optical signal are densely distributed with respect to a spectral linewidth (e.g. $FWHM_{CAV}$) of the passive optical cavity resonance, e.g. by selecting $n*f_p<FWHM_{CAV}$, n being the n-the harmonic. This has the potential benefit that all higher harmonics lead to nearly resonant CW and/or CCW cavity modes when received by the passive optical cavity 106, thus efficiently probing the CW and/or CCW resonance and contributing to a readout signal at the detectors 114, 124 without wasting the available spectral energy. For instance, referring to above example for which a modulation frequency was selected to be 9 MHz for a passive optical cavity having a free spectral range $FSR_{CAV}=2.6$ GHz and finesse F=33.6 at a 1550 nm resonance wavelength, up to the 4-th order higher harmonic can be accommodated in the resonance linewidth of the passive optical cavity. A linewidth of the optical signal emitted by the light emitting unit 101 is generally smaller (e.g. linewidth of the order of tens or hundreds of kilohertz) than the spectral width of the cavity resonance feature, e.g. the resonance linewidth associated with a transmission peak for the add-drop ring resonator configuration for the passive optical cavity 106 in FIG. 2. Next, the phase-modulated first and second optical signal obtained at an output of the modulators 111, 121, e.g. the phase-modulated first and second optical signal with suppressed carriers, are coupled into the passive optical cavity 106, e.g. a spiral-like ring resonator, by means of the optical couplers 112 and 122. Optionally, an optical power level or a carrier suppression level may be monitored by the monitoring detectors 116 and 126 for each of the phase-modulated first and second optical signal prior to their injection into the passive optical cavity 106, e.g. for the purpose of adjusting a signal output power of the light emitting unit 101 or a modulation depth at the modulators 111, 121, e.g. at the first and second phase modulator. The readings of the two monitoring detectors 116 and 126 may also be compared one to another to derive a signal representative of a power-balance ratio between the first and second optical signal before being received by the passive optical cavity 106. A good power-balance is improving the rejection of injection pulling effects in the double carrier suppression scheme. A power-balance ratio may be adjusted by changing a DC component of the signal used for driving the modulators 111 or 121. A power-balance ratio may be different from one for embodiments in which an asymmetric coupling scheme to the optical cavity is present (e.g. for $\kappa_1>\kappa_2$), resulting in good power-balance ratio for the optical powers of a CW cavity mode and a corresponding CCW cavity mode after coupling (in case of several higher harmonics being accommodated in the resonance linewidth of the optical cavity, a corresponding CCW cavity mode exists for a CW cavity mode for each harmonic). Having been received by the passive optical cavity 106, the injected phase-modulated first and second optical signal propagate as two counter-propagating waves of an associated CW cavity mode and an associated CCW cavity mode inside the passive optical cavity 106, completing number of roundtrips which depends on the quality Q-factor of the optical cavity 106. A rotating optical gyroscope 100 will lead to an accumulated phase shift (as stated in Eq. 1), and therefore a detuning in respect of a resonance wavelength of the passive optical cavity 106, wherein the detuning of the resonance wavelength has opposite signs for the counter-propagating CW and CCW cavity mode pair. A magnitude of the detuning is increased, due to the increased effective area in high-quality optic cavities, which yields an improved sensitivity for the optical gyroscope 100. A fraction of the circulating optical power associated with each CW cavity mode and each CCW cavity mode is extracted by means of the optical couplers 122 and 112, respectively providing a first and a second extracted optical signal. If a plurality of CW cavity modes, corresponding to a plurality of higher harmonics, has been accommodated in a resonance linewidth of the optical cavity 106, then the first extracted optical signal, when detected at the readout detector 124, is corresponding to a sum of extracted optical power fractions of each individual CW cavity mode. Likewise, if a plurality of CCW cavity modes, corresponding to a plurality of higher harmonics, has been accommodated in a resonance linewidth of the optical cavity 106, then the second extracted optical signal, when detected at the readout detector 114, is corresponding to a sum of extracted optical power fractions of each individual CCW cavity mode. As the passive optical cavity 106 is configured as an add-drop ring resonator, the extraction of circulating optical power in the optical cavity 106 is in transmission, meaning that for a resonant or nearly resonant cavity mode (e.g. CW or CCW), the corresponding extracted fraction of circulating optical power is associated with a transmission peak in the spectral response/transmittance curve of the ring resonator measured at one of the corresponding optical couplers 122 (for CW modes) or 112 (for CCW modes). In consequence, an optical power level can be significant for the optical signals extracted from the passive optical cavity 106 if their respective wavelengths are being close or approaching a resonance feature of the passive optical cavity 106. This can result in a good signal-to-noise ratio in the subsequent readout circuitry as well as a good resolution of the optical gyroscope 100. Hereafter, the first and second extracted optical signals, e.g. optical signals corresponding to fractions of the optical power circulating as a CW or CCW cavity mode inside the passive optical cavity 106, are input to the interferometric devices 123 and 113, a spectral transmittance curve of which modify (e.g. reshape) their respective spectral power distributions. According to embodiments of the present disclosure, the modification of the spectral power distribution of at least one of the first and second extracted optical signal by at least one interferometric device is characterized by a Vernier effect operated in the first regime. For some embodiments of the present disclosure, a second readout channel is absent or the second interferometric device 113 is absent in the second readout channel. However, it may be of potential benefit to have a symmetrical arrangement with two readout channels, each one including an interferometric device, because a user is then free to choose which one of a CW or CCW cavity mode is launched during an angular rotation velocity measurement or can sequentially select first a CW cavity mode and then a CCW cavity mode for two subsequent angular rotation velocity measurements, the results of which may be compared to each other or combined to further improve the measurement method. Furthermore, such a symmetrical arrangement provides the optical gyroscope with extra redundancy in case of failure of one of the two readout channels. In other embodiments of the present disclosure, the two interferometric devices 113, 123 may be different (e.g. ring resonator and Mach-Zehnder interferometer) and/or may serve different functional purposes. In an embodiment, the interferometric devices are MZIs for which a condition on the wavelength for obtaining constructive interference has been matched to the resonance condition of the passive optical cavity 106, e.g. by aligning a resonance peak of the MZI's spectral transmittance curve with a resonance peak of the passive optical cavity 106 at rest. In practice, the free spectral range of the passive optical cavity 106 may be selected to be larger than the free spectral range of the MZI(s), $FSR_{CAV} > FSR_{MZI}$. Therefore, in order to meet the criterion of operating in the first Vernier regime according to Eq. 3, a difference in free spectral range ΔFSR is also designed larger than the characteristic spectral width of the MZI at the spectral resonance feature used for sensing, e.g. $\Delta FSR > FWHM_{MZI}$. Here it is assumed that the characteristic spectral width of the MZI dominates the characteristic spectral width of the passive optical cavity 106, e.g. $FWHM_{MZI} > FWHM_{CAV}$.

During calibration of the optical gyroscope 100 at rest, the carrier wavelength of the first and second optical signal is swept by sweeping the carrier wavelength of a source signal which is then split by a 50/50 directional coupler 103. The sweeping of the carrier wavelength may be obtained, for instance, by tuning of a tunable laser source, by switching between a plurality of light emitters emitting at different wavelengths in a time-shared manner (e.g. by allotting a light emission interval to each of the light emitters) or by switching, in a time-shared manner, between a plurality of wavelength selective narrowband filter channels optically coupled to at least one broadband light emitter. In addition thereto, the second optical signal is phase-modulated via modulator 121 in such a way that the swept carrier wavelength is suppressed and higher harmonics are generated. The first optical signal may be received by the optical cavity 106 without being phase-modulated, e.g. calibration may be performed according to a single carrier suppression modulation scheme. To avoid detrimental injection locking effects, the modulation frequency for the second modulator 121 may be increased in such a way to fully exploit the available bandwidth associated with a resonance linewidth of the optical cavity 106 at rest, e.g. by selecting a modulation frequency to be close to a half-width of a resonance linewidth of the optical cavity 106. The wavelength sweep may be performed continuously (e.g. with discrete sampling of the readout detectors) or step-wise; either way the points of a combined spectral transmittance curve of the optical gyroscope 100 can be probed, wherein a combined spectral transmittance curve corresponds to a product of the spectral transmittance curves relative to the optical cavity 106 and to the first interferometric device 123, 123*a*, 123*b*. A range of swept wavelengths includes at least one resonance feature of the passive optical cavity 106, e.g. a transmission peak of a resonant CW cavity mode. At rest, the transmission peaks of the resonant CW cavity mode and the resonant CCW cavity mode are spectrally indistinct. If a resonance peak associated with the first interferometric device 123, 123*a*, 123*b* (e.g. a transmission peak of a Mach-Zehnder interferometer 70, 71) is in good alignment with a resonance peak associated with the optical cavity 106, a peak power level detected at a first readout detector 124, 124*a* will be maximized during the wavelength sweep. By comparison, if the resonance peak associated with the first interferometric device 123, 123*a*, 123*b* is slightly or more drastically misaligned in respect of a resonance peak associated with the optical cavity 106, a detected peak power level, as detected by the first readout detector 124, 124*a*, will be inferior. Therefore, repeatedly sweeping the carrier wavelength over at least one spectral resonance feature of the optical cavity 106 and adjusting a bias phase shift 60, 61 of the first interferometric device 123a, 123b after each wavelength sweep of the carrier wavelength in a direction of increasing peak power levels, will achieve a good alignment of both resonance peaks at rest.

In particular embodiments of the disclosure, a second bias phase shift 62 of the first interferometric device 123b may be adjusted during the alignment stage, when calibrating the optical gyroscope. In such embodiments of the disclosure, the second bias phase shift 62 is adjusted by increasing the detected peak power level at a further readout detector 124b, wherein a good alignment is achieved between a further resonance peak associated with the optical cavity 106, e.g. a transmission peak associated with a resonant CW cavity mode that is spectrally adjacent to the foregoing one, used for adjusting the first bias phase shift 60, 61, and a further resonance peak associated with the first interferometric device 123, e.g. a transmission peak associated with a second Mach-Zehnder 72. Detected lower optical power levels at the further readout detector 124b would lead to sub-optimal adjustment of the second bias phase shift 62, which can be avoided, as it would be the case if the second bias phase shift 62 was adjusted on a minimum (e.g. transmission dip) on the transmittance curve associated with the second Mach-Zehnder 72 of the first interferometric device 123b, corresponding to a maximum (e.g. transmission peak) on the transmittance curve associated with the first Mach-Zehnder 721 of the first interferometric device 123b. Alternatively, the second bias phase shift 62 may be adjusted by reducing the detected peak power level at a further readout detector 124b, wherein a good alignment is achieved between a further resonance/transmission peak associated with the optical cavity 106, e.g. a transmission peak associated with a resonant CW cavity mode that is adjacent to the foregoing one, used for adjusting the first bias phase shift 60, 61, and an anti-resonance feature associated with the first interferometric device 123b, e.g. a transmission dip associated with a second Mach-Zehnder 72. This way of adjusting the second bias phase shift 62 may be of potential benefit if a tunable wavelength range of a light emitter, e.g. a tunable laser, is limited, e.g. limited to less than the free spectral range of the optical cavity 106. This limitation of the tuning range may be determined by speed considerations too, meaning that for a fast enough wavelength scan over a pre-determined wavelength region of interest, this region is reduced and determines the operative tuning range of the light emitter.

Figure 8:
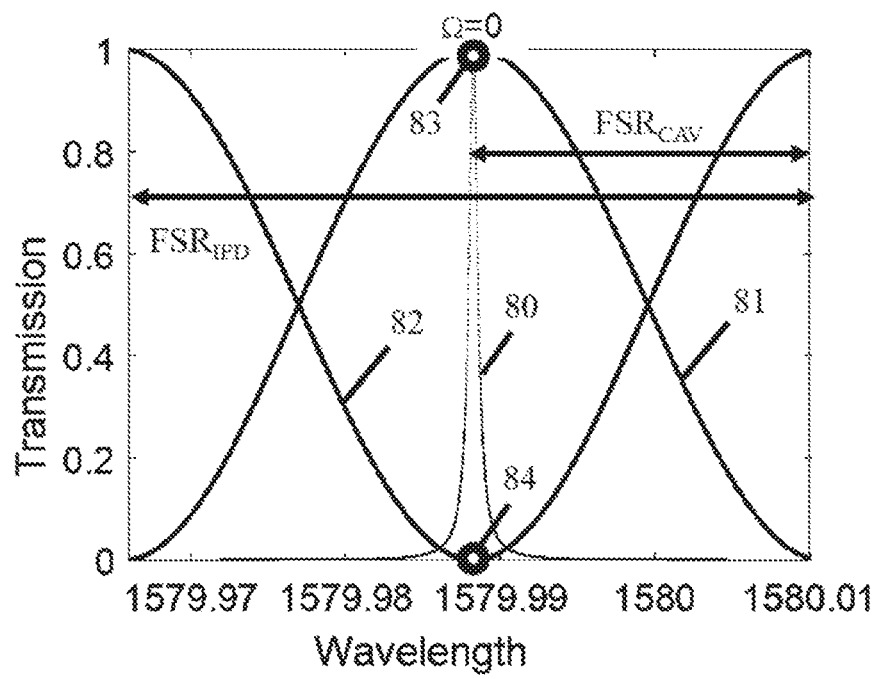
FIG. 8 is a diagram explaining one way of achieving a spectral alignment between spectral transmittance curves related to the optical cavity and the at least one interferometric device during calibration of the optical gyroscope, according to an example embodiment.

In FIG. 8, it is further explained how alignment is achieved between at least one resonance feature associated with the optical cavity 106 on the one hand and a resonance feature associated with the first interferometric device 123b on the other hand. In this example, a spectral transmittance curve 81 for a first Mach-Zehnder interferometer 71 of the first interferometric device 123b can be shifted along the wavelength axis by changing a first bias phase shift 61, e.g. by applying a greater or smaller bias voltage to one arm of the first Mach-Zehnder interferometer 71. Likewise, a spectral transmittance curve 82 for a second Mach-Zehnder interferometer 72 of the first interferometric device 123b can be shifted along the wavelength axis by changing a second bias phase shift 62, e.g. by applying a greater or smaller bias voltage to one arm of the second Mach-Zehnder interferometer 72. In this example, the spectral transmittance curve 82 for a second Mach-Zehnder interferometer 72 is designed to have a default pi phase shift with respect to the spectral transmittance curve 81 associated with the first Mach-Zehnder interferometer 71 and at a resonance wavelength of the optical cavity. When stepping the carrier wavelength during a sweep, the detector 124a will progressively detect a series of optical power levels 80, corresponding to a series of interrogated points on a combined spectral transmittance curve of the optical gyroscope, e.g. the product of spectral transmittances of the first Mach-Zehnder interferometer 71 and of the optical cavity 106 at rest. Using a fast tunable laser source, for example sweeping at 130 nm/s, sweeping the carrier wavelength range in FIG. 8 takes only a fraction of a millisecond. A peak power level 83 may be derived from the detected series of power levels 80, e.g. by means of a fast peak detection circuit or by means of a suitable signal processor 125 connected to an output of the detector 124a. This peak power level 83 will be increasing with an increasing degree of alignment. At the end of a successful alignment step of the optical gyroscope at rest, a resonance feature in the spectral transmittance curve related to the first interferometric device 123b is spectrally aligned with a resonance feature of the optical cavity 106, e.g. the resonance peak of the first Mach-Zehnder interferometer 71 is spectrally aligned with a resonance peak (e.g. for the CW cavity mode) of the optical cavity 106. Moreover, a feature in the spectral transmittance curve related to the second Mach-Zehnder interferometer 72 is spectrally aligned with a resonance feature of the optical cavity 106, e.g. a dip 84 in the spectral transmittance curve related to the second Mach-Zehnder interferometer 72 is spectrally aligned with a resonance peak (e.g. for the CW cavity mode) of the optical cavity 106. This may be achieved by adjusting another peak power level (e.g. next peak power level adjacent to the dip 84 in the spectral transmittance curve related to the second Mach-Zehnder interferometer 72), which may also be derived from a detected series of optical power levels at the output of the further detector 124b, e.g. by means of a fast peak detection circuit or by means of a suitable signal processor 125 connected to an output of the detector 124b. If the tuning range for the carrier wavelength is large enough to enable probing of an adjacent resonance peak in the spectral transmittance curve associated with the optical cavity 106 and for the particular case of selecting a first Vernier regime for which $FSR_{IFD}=2*FSR_{CAV}$, another feature in the spectral transmittance curve related to the second Mach-Zehnder interferometer 72 may be spectrally aligned with a resonance feature of the optical cavity 106, e.g. a peak in the spectral transmittance curve related to the second Mach-Zehnder interferometer 72 may be spectrally aligned with an adjacent resonance peak (e.g. separated by a free spectral range of the optical cavity $FSR_{CAV}$) of the optical cavity 106.

The alignment step may be carried out initially, before using the optical gyroscope for measuring angular rotation velocities, or may be repeated at regular time intervals if the device is known to be at rest.

An optical power level detected at the second detector 114, being associated with the phase-modulated second optical signal that has been transmitted by the optical cavity 106, may serve as a wavelength reference during the sweep of the carrier wavelength. A feedback signal to the light emitting unit 101 may be provided after having processed the reference signal received at the second detector 114, e.g. via filtering and/or lock-in amplification comprised in processor 115, to stabilize possible drifts of the swept carrier wavelength caused by the light emitting unit itself, fluctuations in the resonance wavelength of the optical cavity 106 due to thermal or pressure fluctuations, etc.

In a further calibration step, a calibration curve of the optical gyroscope may be determined, e.g. by recording an obtained peak power level as a function of an angular rotation velocity to which the optical gyroscope is subject. Such calibration curve may be used as look-up table and/or for interpolation during operation of the optical gyroscope, relating a detected peak power level to a measured angular rotation velocity. It may also be used, next to available prior knowledge of the optical gyroscope to establish the resolution and/or sensitivity of the optical gyroscope. Referring to the example in FIG. 8, the swept carrier wavelength range may correspond to a measurable angular rotation velocity range of +/−2 deg/s.

Figure 9:
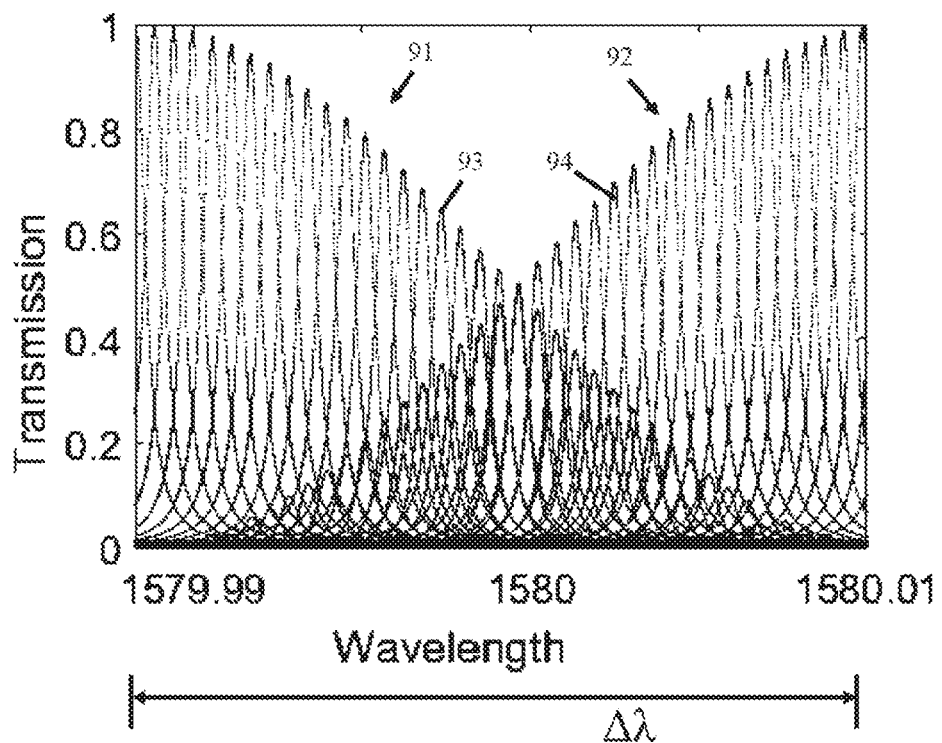
FIG. 9 is a diagram explaining one way of performing an optical power-based angular rotation velocity measurement using a calibrated optical gyroscope, according to an example embodiment.

A calibrated optical gyroscope may be used to measure an angular rotation velocity. This is further explained with reference to FIG. 9. As for the alignment step(s) during calibration, a single carrier modulation scheme may be used, that is, the second optical signal is phase-modulated via modulator 121 in such a way that the swept carrier wavelength is suppressed and higher harmonics are generated, while the first optical signal may be received by the optical cavity 106 without being phase-modulated. To avoid detrimental injection locking effects, the modulation frequency for the second modulator 121 may be selected in such a way to fully exploit the available bandwidth associated with a resonance linewidth of the optical cavity 106 at rest, e.g. by selecting a modulation frequency to be close to a half-width of a resonance linewidth of the optical cavity 106. In operation, the optical gyroscope 100 is subject to a rotating movement in a positive sense (Ω+) or in a negative sense (Ω−), causing a shift in the respective resonance wavelengths associated with the CW and the CCW cavity mode. Stepping the carrier wavelength through a tunable range, using means previously discussed in respect of the alignment stage, the detector 124a will progressively detect a series of optical power levels 93, corresponding to a series of interrogated points on a combined spectral transmittance curve of the rotating optical gyroscope, e.g. the product of spectral transmittances of the first Mach-Zehnder interferometer 71 and of the optical cavity 106. Depending on the angular rotation velocity and sense, the detected a series of optical power levels 93 is shifted to lower or higher wavelengths. As a result of the Vernier effect operated in the first regime, the resonance peak in the spectral transmittance curve associated with a resonant CW cavity mode is multiplied by the spectral transmittance curve of the first Mach-Zehnder interferometer 71, giving rise to a modulation of the detected peak power level at the readout detector 124a. Referring to FIG. 9, this is described by the envelope 91 of peak power levels obtained for increasingly fast angular rotation velocities in the negative sense (Ω−), wherein the envelope 91 is following the spectral transmittance curve of a spectrally broader resonance feature of the first Mach-Zehnder interferometer 71. Therefore, a readout channel for the optical gyroscope 100 detects a change in the detected optical power level, e.g. the extracted peak power level, to derive an angular rotation velocity, rather than requiring a more complex readout related to a measurement of the shift in the resonance wavelength of the cavity. If a tuning range for the swept carrier wavelength (Δλ) has a lower bound at a resonance peak of the first Mach-Zehnder interferometer 71, as shown in FIG. 9, an angular rotation velocity in a positive sense (Ω+), may be derived from an envelope 92 of peak power levels detected via the further readout detector 124b. The detected plurality of wavelength-shifted series of optical power levels 94 under the envelope 92 are attributed to the Vernier effect, operated in the first regime, between an adjacent resonance peak (e.g. next order resonance) in the spectral transmittance curve associated with a resonant CW cavity mode and the spectral transmittance curve of the second Mach-Zehnder interferometer 72, wherein the spectral transmittance curve of the second Mach-Zehnder interferometer 72 is shifted by a half free spectral range ($FSR_{IFD}/2$) of the first interferometric device 123b with respect to the spectral transmittance curve of the first Mach-Zehnder interferometer 71, which also corresponds to a full free spectral range of the optical cavity 106 ($FSR_{CAV}$) in this particular example. In different embodiments, more than two Mach-Zehnder interferometers may be comprised in the first interferometric device 123, each of which has associated with it a spectrally shifted transmittance curve. This broadens the range and/or directions of angular rotation velocities which are measurable in a highly sensitive manner to the full dynamic range of the optical gyroscope 100. In embodiments of the present disclosure, the dynamic range of the optical gyroscope may be very large, ideally infinite, because of the periodic nature of resonant features in both the spectral transmittance curves of the optical cavity 106 and the interferometric device 123, e.g. the Mach-Zehnder interferometer(s). Practically, the dynamic range may be limited by group velocity dispersion or the finite tuning range for the swept carrier wavelength. It can be inferred from FIG. 9 that a larger tuning range (Δλ) may be exploited by the signal processor 125 to switch from the envelope 91 to an adjacent envelope 92 as soon as a detected peak power level drops below a pre-determined threshold, e.g. 0.5 in FIG. 9. To support switching between adjacent envelopes, the signal processor may be adapted to count the number of previously encountered highest peak power levels and to track slope changes over consecutive angular rotation velocity measurements.

During angular velocity measurements, the phase-modulated second optical signal transmitted by the optical cavity 106, e.g. associated with a fraction of the optical power in the CCW cavity mode, may be detected by the readout detector 114 and be used by signal processor 115 for generating a feedback signal, which may be applied to the light emitting unit 101 to stabilize the same and/or to compensate for drifts or fluctuations related to the optical cavity 106. Furthermore, the so generated feedback signal may be used to trigger a sweep of the carrier wavelength and/or determine its start wavelength. Signal processor 115 connected to an output of the readout detector 114 may also comprise demodulation circuitry, e.g. a lock-in amplifier, for recovering the swept carrier wavelength from the signal received at the readout detector 114. Alternatively, instead of applying a feedback signal or error signal to the light emitting unit for adjusting its emitted carrier wavelength, e.g. via adjustment of its pump current, the feedback signal or error signal may be applied to a phase-tuning element provided in or on or close to a waveguide of the optical cavity for adjusting the optical path length of the cavity in response to fluctuation thereof. Additionally, it is possible to monitor optical power changes at the reflection ports of the optical couplers 112, 122 for providing further feedback signals.

Embodiments of the present disclosure using single carrier suppression modulation schemes may include the first modulator 111 as means for adjusting an optical power of the first optical signal in the context of asymmetric coupling schemes. For such particular embodiments, the first modulator 111 acts like a DC variable attenuator. Therefore, it is possible to achieve power-balance for an excited CW cavity mode and an excited CCW cavity mode even in the presence of an asymmetric coupling to the optical cavity 106.

According to an alternative way of operating the optical gyroscope 100 in measurement mode, both the first and the second optical signal may be phase-modulated according to a double carrier suppression modulation scheme. This has the potential benefit of further reducing backscattering induced noise limitations in sensitive optical gyroscopes, to further reduce injection locking or injection pulling effects because of the improved power-balance between corresponding higher harmonics of the CW and CCW cavity modes, and to more efficiently exploit the available spectral energy confined in higher order harmonics. Contrary to the embodiments using single carrier suppression, embodiments related to double carrier suppression modulation schemes have multiple harmonics contributing to a detected optical power level at a readout detector. However, this effect is negligible for densely distributed higher harmonics with respect to a spectral width of a resonance feature in the spectral transmittance curve of the optical cavity 106. Due to their symmetric distribution, the contribution of multiple higher harmonics to a detected optical power level at a readout detector is still large if the suppressed carrier is in spectrally aligned with a resonance wavelength of the optical cavity 106.

It is also possible, in some embodiments of the disclosure, to not use any modulator at all, thus receiving first and the second optical signals by the passive optical cavity 106 which are not phase-modulated and have their spectral energy concentrated in their respective carriers. This may be the case, for example, in integrated waveguide platforms in which a sidewall of an optical waveguide used for providing the passive optical cavity 106 is nearly perfectly smooth, thus not generating at all or generating at a negligible amount backscattered light. If the first and second optical signal are power-balanced and provided by two different light emitters, e.g. by first and second tunable lasers, the resulting carriers may have a different wavelength, avoiding injection locking. The first and second tunable lasers may be coupled together to have their emitted wavelengths moving in synchrony when performing a sweep of the carrier wavelength.

It is noted that the operation of the optical gyroscope is symmetrical in respect of the CW and the CCW cavity modes or, analogous thereto in respect of the first and second optical signal, meaning that interchanging these signals in the foregoing description and providing a second interferometric device 123 also leads to working embodiments of the disclosure.

While the disclosure has been illustrated and described in detail in the drawings and foregoing description, such illustration and description are to be considered illustrative or exemplary and not restrictive. The foregoing description details certain embodiments of the disclosure. It will be appreciated, however, that no matter how detailed the foregoing appears in text, the disclosure may be practiced in many ways. The disclosure is not limited to the disclosed embodiments.

Figure 3:
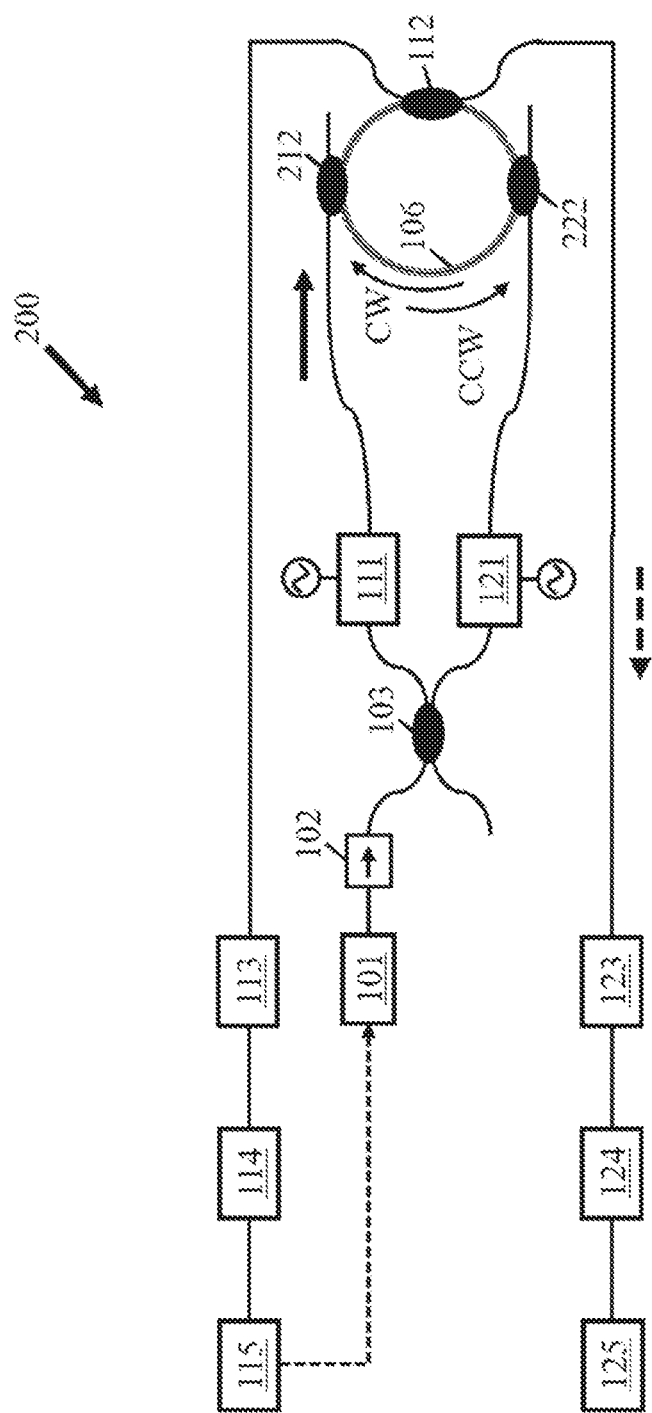
FIG. 3 shows a schematic of an alternative optical gyroscope comprising a passive closed-path optical cavity coupled to two optical couplers for respectively injecting CW and CCW optical signals, and an extractor also being an optical coupler coupled to the cavity, according to an example embodiment.

Referring to FIG. 3, for example, an alternative embodiment of an optical gyroscope 200 is shown, which differs from the optical gyroscope 100 of FIG. 2 in that the two additional couplers 104, 105 and monitoring detectors 116, 126 are absent. Moreover, the passive optical cavity 106 is optically coupled to a single extractor 112 only, e.g. via integrated MIMI couplers, directional waveguide couplers, star couplers, etc., and the extractor 112 is not coincident with either of the first coupler 212 at a first position along the passive optical cavity 106 or the second coupler 222 at a second position along the passive optical cavity 106, wherein the first and second coupler 212, 222 are used to couple the phase-modulated optical signals as two counter-propagating optical signals, e.g. the phase-modulated CW and CCW waves, into the passive optical cavity 106. In the absence of the two additional couplers 104, 105, no additional optical losses (e.g. saving up to 6 dB for two 50/50 splitters 104, 105) are experienced by the phase-modulated optical signals before they are injected into the passive optical cavity 106, which improves the detectable signal strength and signal-to-noise ratio at the readout detectors 114, 124 without an increase of the optical signal intensity level by the light emitting unit 101. Increasing the optical signal intensity level at the light emitting unit 101 reduces the power efficiency of the gyroscope device and may lead to non-linearities in the PLC waveguides and/or the light emitter itself, e.g. the laser. Monitoring of the phase-modulated optical signal strengths, e.g. optical power levels, of the power-balance of the two phase-modulated optical signals, of the resonance behavior of a circulating optical wave (e.g. the CW or the CCW cavity mode or both) in the passive optical cavity 106, or other optical calibration parameters which may be tracked, can still be afforded, although at a reduced signal level, by placing sensitive detectors (not shown) at the reflection ports of the first and/or second couplers 212, 222. The passive optical cavity 106 of the optical gyroscope 200 is still configured as an add-drop resonator, which means that the extracted fractions of optical power associated with the circulating CW and CCW cavity modes through the extractor 112 are obtained in transmission for the optical cavity 106, meaning that extracted optical power fractions associated with a cavity mode are detectable as transmission peaks in the spectral transmittance curve of the passive optical cavity 106 used in determining a first regime of the Vernier effect for the combined spectral transmittance curve. Therefore, an extracted optical power fraction typically has a larger amplitude than for an optical cavity in an all-pass configuration and the interferometric devices 113, 123 as well as the readout detectors 114, 124 will receive stronger optical signals, which can improve the resolution of the optical gyroscope 200.

Figure 4:
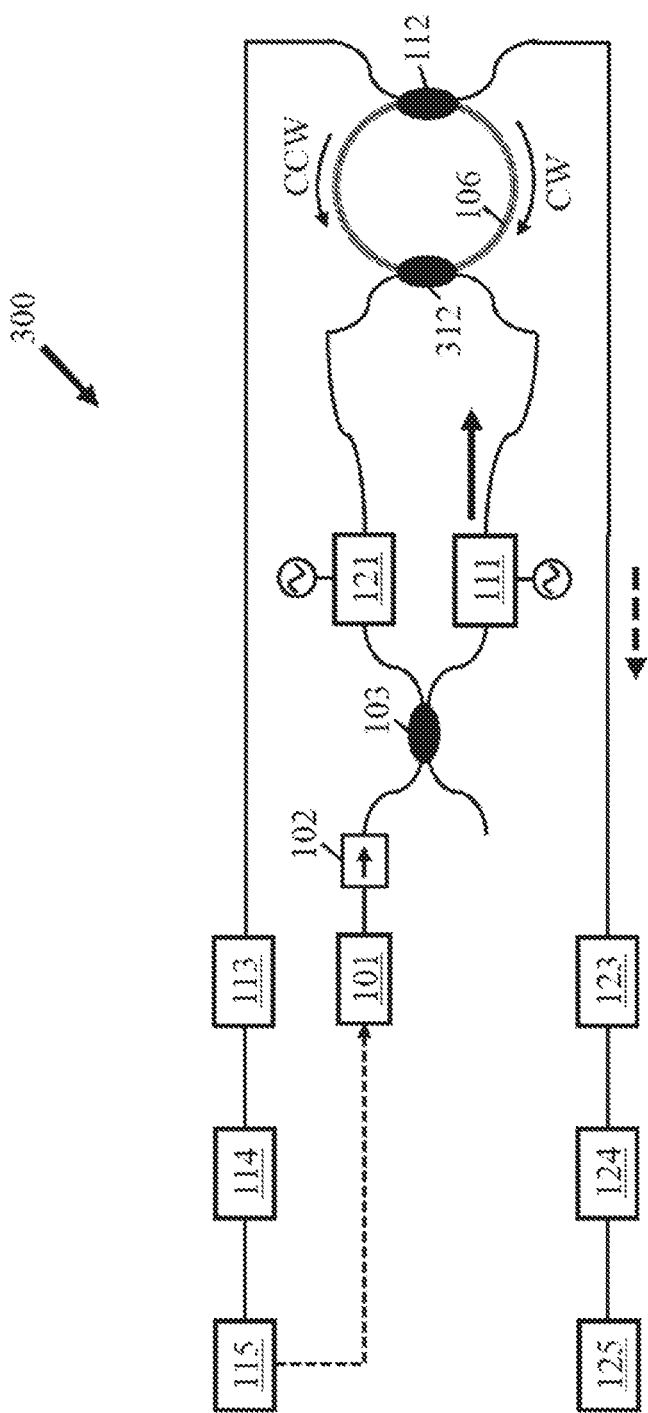
FIG. 4 shows a schematic of an alternative optical gyroscope comprising a passive closed-path optical cavity coupled to one optical coupler for injecting both CW and CCW optical signals, and an extractor also being an optical coupler coupled to the cavity, according to an example embodiment.

FIG. 4 shows an embodiment of an optical gyroscope 300 which is a variation of the previous optical gyroscope 200. Here, the first and second position of first and second coupler 212, 222 coincide, resulting in a single coupler 312 for coupling both the phase-modulated first and second optical signal into the passive optical cavity 106. A single coupler 312 decreases the load of the passive optical cavity 106, thereby improving its compound Q-factor and the overall gyroscope resolution. This embodiment is particularly suited for optical gyroscopes and material platforms in which intra-cavity backscattering is intrinsically low.

Figure 5:
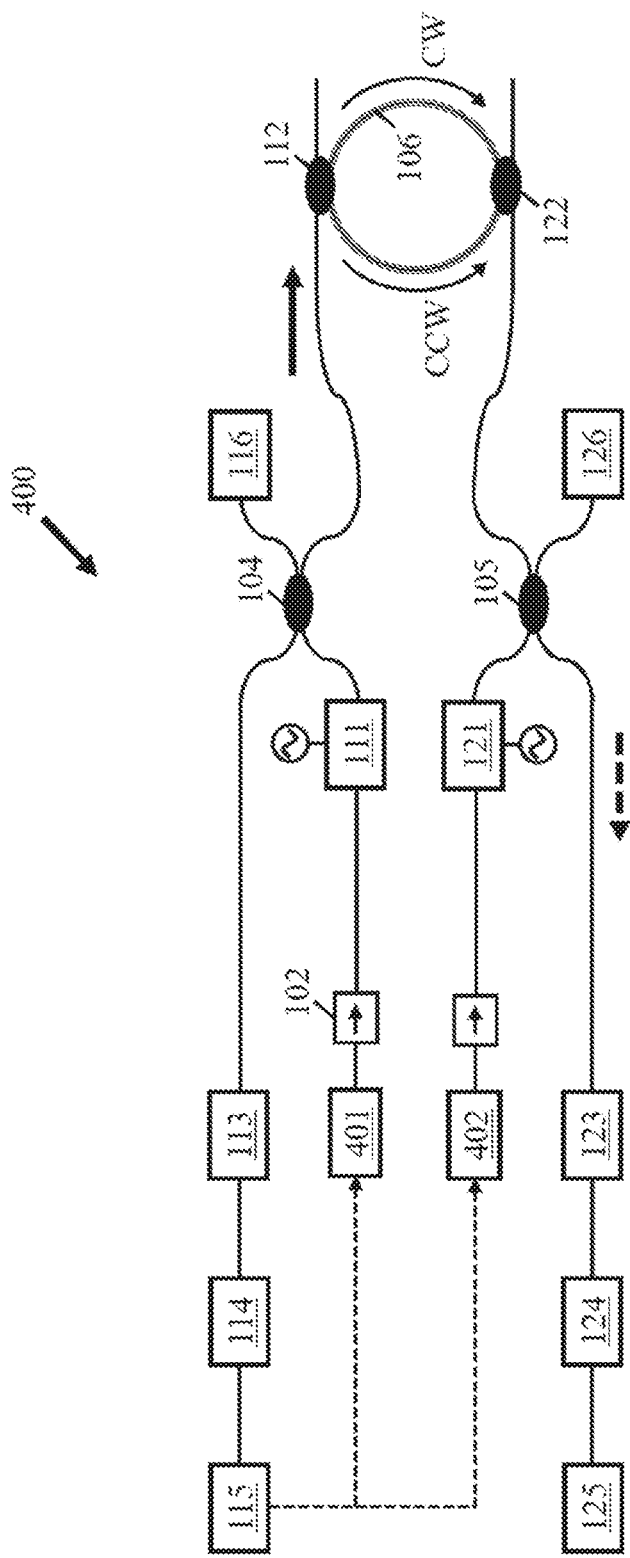
FIG. 5 shows a schematic of an alternative optical gyroscope comprising two light emitting units, according to an example embodiment.

Referring to FIG. 5, an alternative embodiment of an optical gyroscope 400 is shown, which differs from the optical gyroscope 100 of FIG. 2 in that two light emitting units 401, 402 are provided. Their emission wavelengths may be individually adjusted, e.g. for stabilizing a resonance peak of the passive optical cavity 106 by means of one or more feedback signals derived from detected optical power levels. Alternatively, the light emitters, e.g. lasers, of the two light emitting units 401, 402 may be locked to each other, e.g. via a third seed laser, such that their emission wavelengths are stabilized relative to each other. An optical splitter 103 may be absent for this embodiment. The two light emitting units 401, 402 may be coupled each to an optical isolator 102. Each of the two light emitting units 401, 402 may be driven to generate a lower optical signal intensity level as compared to a single light emitting unit coupled to a 50/50 splitter, which may reduce non-linearities and/or heating caused by the optical signal source. In a fully integrated optical gyroscope 400, the light emitting units 401, 402 may include light emitters which can be directly modulated, e.g. the modulator 111 and the light emitting unit 401 could form a single compact integrated photonic device on the PLC, for modulator 121 and the light emitting unit 402.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. An optical gyroscope comprising:
   an optical cavity configured for receiving a first optical signal such that the first optical signal propagates within the optical cavity according to a clockwise mode of the optical cavity or a counter-clockwise mode of the optical cavity,
   an extractor configured for extracting a portion of the first optical signal from the optical cavity, an amplitude of the portion of the first optical signal depending on a carrier wavelength of the first optical signal according to a first spectral transmittance curve comprising a first plurality of transmission peaks,
   a readout channel configured for spectrally modifying the portion of the first optical signal and configured for detecting optical power levels of the modified portion of the first optical signal, the readout channel comprising an interferometric device having associated therewith a second spectral transmittance curve comprising a second plurality of transmission peaks, the interferometric device being adapted for spectrally aligning a second transmission peak on the second spectral transmittance curve with a first transmission peak on the first spectral transmittance curve, wherein a difference in free spectral ranges associated with the second spectral transmittance curve and the first spectral transmittance curve is such that a spectral modification, determined by a spectral product obtained from the second spectral transmittance curve and from the first spectral transmittance curve, produces a spectral Vernier effect in a wavelength region of interest, and wherein the difference between the free spectral ranges is greater than any spectral widths associated with the first plurality of transmission peaks or the second plurality of transmission peaks in the wavelength region of interest, and
   a detector optically coupled to an output of the interferometric device.

2. The optical gyroscope according to claim 1, wherein the optical cavity is configured for receiving a second optical signal, an orientation of a first mode corresponding to the first optical signal being opposite to an orientation of a second mode corresponding to the second optical signal.

3. The optical gyroscope according to claim 1, further comprising a modulator configured for modulating a phase of the first optical signal prior to insertion of the first optical signal into the optical cavity.

4. The optical gyroscope according to claim 3, wherein the modulator comprises a first phase modulator and a second phase modulator being respectively associated with the clockwise mode and the counter-clockwise mode, the first phase modulator and the second phase modulator being configured for modulating phases of optical signals at two different frequencies.

5. The optical gyroscope according to claim 3, wherein the modulator comprises one or more of a carrier injection modulator, a carrier depletion modulator, a thermo-optical modulator, a electro-optic modulator, or a modulator that functions based on a phase change material in a cladding.

6. The optical gyroscope according to claim 1, wherein the extractor comprises a first optical coupler and a second optical coupler, and wherein the optical cavity is configured for receiving the first optical signal via the first optical coupler at a first position or via the second optical coupler at a second position.

7. The optical gyroscope according to claim 1, wherein the optical cavity is configured for receiving the first optical signal via a first optical coupler at a first position and for receiving a second optical signal via the first optical coupler or via a second optical coupler at a second position different from the first position, the first optical coupler and the second optical coupler being distinct from the extractor.

8. The optical gyroscope according to claim 1, wherein the interferometric device comprises at least one Mach-Zehnder interferometer and/or comprises at least one ring resonator.

9. The optical gyroscope according to claim 1, further comprising a light emitting unit configured for generating the first optical signal.

10. The optical gyroscope according to claim 9, wherein the light emitting unit comprises a tunable laser and/or an optical isolator.

11. The optical gyroscope according to claim 1, the optical gyroscope being provided as a planar lightwave circuit.

12. The optical gyroscope according to claim 11, wherein the planar lightwave circuit is formed in a substrate comprising silicon on insulator, silicon nitride, multi-layered silicon-silicon nitride and/or a III-V material.

13. The optical gyroscope according to claim 1, further comprising a signal processor and/or a peak detection circuit electrically coupled to an output of the readout channel configured for determining an angular rotation velocity of the optical gyroscope based on detected optical power levels.

14. The optical gyroscope according to claim 13, wherein the signal processor and/or the peak detection circuit are further configured to provide a feedback signal to a light emitting unit for stabilizing an emitted carrier wavelength of the light emitting unit against drifts and/or for aligning an emitted carrier wavelength of the light emitting unit with a transmission peak of the first spectral transmittance curve.

15. A method for measuring an angular rotation velocity of a rotating reference frame, comprising performing for each carrier wavelength in a plurality of carrier wavelengths to be scanned in a wavelength region of interest acts comprising:
   generating a first optical signal at the carrier wavelength;
   modulating, at a modulation frequency, an optical phase of the first optical signal;
   directing a portion of the modulated first optical signal onto a closed-loop trajectory, the first optical signal thereby circulating in a clockwise direction or a counter-clockwise direction along the closed-loop trajectory, an enclosed area of the closed-loop trajectory being non-zero in a plane perpendicular to an axis of rotation;

extracting from the closed-loop trajectory, at each roundtrip, a portion of the first optical signal;

self-interfering the portion of the first optical signal with a delayed version thereof so as to produce a Vernier effect in a spectral domain, a spectral period of an accumulated optical phase due to a delay differing from a spectral period of an accumulated optical phase during one roundtrip on the closed-loop trajectory by more than a spectral resonance width associated with an overlapping resonance condition for the closed-loop trajectory and for the self-interfering, a reference carrier wavelength being determined by the overlapping resonance condition for the closed-loop trajectory and for the self-interfering;

detecting an optical power level for the first optical signal after self-interference;

determining a peak power level and a corresponding carrier wavelength in a sequence of power levels detected for the plurality of carrier wavelengths, the corresponding carrier wavelength being indicative of a wavelength detuning with respect to the reference carrier wavelength; and determining the angular rotation velocity based on the corresponding carrier wavelength detuning.

* * * * *